United States Patent
Klower

(10) Patent No.: US 11,873,572 B2
(45) Date of Patent: Jan. 16, 2024

(54) ELECTROPOLISHING METHOD

(71) Applicant: 3DM BIOMEDICAL PTY LTD, Moruya (AU)

(72) Inventor: Dean Klower, Moruya (AU)

(73) Assignee: 3DM BIOMEDICAL PTY LTD, New South Wales (AU)

( * ) Notice: Subject to any disclaimer, the term of this patent is extended or adjusted under 35 U.S.C. 154(b) by 172 days.

(21) Appl. No.: 17/601,222

(22) PCT Filed: Mar. 24, 2020

(86) PCT No.: PCT/AU2020/050280
§ 371 (c)(1),
(2) Date: Oct. 4, 2021

(87) PCT Pub. No.: WO2020/206492
PCT Pub. Date: Oct. 15, 2020

(65) Prior Publication Data
US 2022/0178047 A1    Jun. 9, 2022

(30) Foreign Application Priority Data
Apr. 9, 2019   (AU) ................... 2019901205

(51) Int. Cl.
*C25F 3/26*    (2006.01)
*B23H 3/00*    (2006.01)
(Continued)

(52) U.S. Cl.
CPC ............... *C25F 3/26* (2013.01); *B23H 3/00* (2013.01); *C25F 3/20* (2013.01); *C25F 3/24* (2013.01);
(Continued)

(58) Field of Classification Search
CPC .... C25F 7/00; C25F 3/16–26; B23H 3/00–10; B23H 2300/10
See application file for complete search history.

(56) References Cited

U.S. PATENT DOCUMENTS

| | | |
|---|---|---|
| 2,473,923 A | 6/1949 | Turner |
| 4,140,598 A | 2/1979 | Kimoto et al. |
| (Continued) | | |

FOREIGN PATENT DOCUMENTS

| | | |
|---|---|---|
| AU | 2013/242795 A1 | 5/2014 |
| AU | 2017/204328 A1 | 11/2017 |
| (Continued) | | |

OTHER PUBLICATIONS

International Search Report dated May 1, 2020 issued in corresponding International Application No. PCT/AU2020/050280.
(Continued)

*Primary Examiner* — Nicholas A Smith
(74) *Attorney, Agent, or Firm* — Harness, Dickey & Pierce, P.L.C.

(57) ABSTRACT

A method for electropolishing a manufactured metallic article, the method comprising: contacting the metallic article with an electropolishing electrolyte; and electropolishing the metallic article in the electropolishing electrolyte through the application of an applied current regime comprising: at least one electropolishing regime, each electropolishing regime comprising a current density of at least 2 A/cm² and a voltage comprising a shaped waveform having a frequency from 2 Hz to 300 kHz, a minimum voltage of at least 0 V and a maximum voltage of between 0.5 to 500 V.

20 Claims, 9 Drawing Sheets

(51) Int. Cl.
*C25F 3/20* (2006.01)
*C25F 3/24* (2006.01)
*C25F 7/00* (2006.01)
*B24B 37/04* (2012.01)

(52) U.S. Cl.
CPC ............ *C25F 7/00* (2013.01); *B23H 2300/10* (2013.01); *B24B 37/046* (2013.01)

(56) References Cited

U.S. PATENT DOCUMENTS

| | | | |
|---|---|---|---|
| 5,164,051 | A | 11/1992 | Komaki et al. |
| 5,599,437 | A | 2/1997 | Taylor et al. |
| 6,315,885 | B1 | 11/2001 | Hocheng |
| 6,402,931 | B1 | 6/2002 | Zhou et al. |
| 6,533,917 | B1 | 3/2003 | Nishino et al. |
| 6,558,231 | B1 | 5/2003 | Taylor |
| 6,682,645 | B2 | 1/2004 | Nishino et al. |
| 6,835,299 | B1 * | 12/2004 | Tchugunov .............. B23H 7/18 205/672 |
| 7,156,975 | B2 | 1/2007 | Sato et al. |
| 8,357,287 | B2 | 1/2013 | Clasquin et al. |
| 9,006,147 | B2 | 4/2015 | Taylor et al. |
| 9,987,699 | B2 | 6/2018 | Taylor et al. |
| 2002/0109797 | A1 | 8/2002 | Chung et al. |
| 2002/0128379 | A1 | 9/2002 | Hasegawa et al. |
| 2002/0169516 | A1 * | 11/2002 | Brussee .................. B23H 3/02 700/162 |
| 2003/0075456 | A1 | 4/2003 | Collins et al. |
| 2004/0154931 | A1 | 8/2004 | Hongo et al. |
| 2005/0016867 | A1 | 1/2005 | Kreiskott et al. |
| 2005/0145508 | A1 | 7/2005 | Larsen et al. |
| 2006/0049056 | A1 | 3/2006 | Wang et al. |
| 2007/0187258 | A1 | 8/2007 | Du et al. |
| 2009/0095637 | A1 | 4/2009 | Toma et al. |
| 2011/0303553 | A1 | 12/2011 | Inman et al. |
| 2014/0018244 | A1 | 1/2014 | Taylor et al. |
| 2014/0277392 | A1 | 9/2014 | Webler, Jr. |
| 2018/0178302 | A1 | 6/2018 | Taylor et al. |
| 2019/0345628 | A1 | 11/2019 | Hansal et al. |

FOREIGN PATENT DOCUMENTS

| | | |
|---|---|---|
| CN | 1152634 A | 6/1997 |
| CN | 1842577 A | 10/2006 |
| CN | 1906333 A | 1/2007 |
| CN | 102953114 B | 2/2016 |
| CN | 105420805 A | 3/2016 |
| EP | 0445305 A1 | 9/1991 |
| JP | S60159200 A | 8/1985 |
| JP | 2005/206928 A | 8/2005 |
| JP | 2010077478 A | 4/2010 |
| JP | 2015175055 A | 10/2015 |
| KR | 101591438 B1 | 2/2016 |
| WO | WO-2009/105802 A1 | 9/2009 |
| WO | WO-2017/060701 A1 | 4/2017 |
| WO | WO-2018/102844 A1 | 6/2018 |

OTHER PUBLICATIONS

Irina Makarova and Alexander Chernik, 'Using of Pulse Modes in Non-Chromium Electrolytes for Electropolishing' *Promising Materials and Processes in Applied Electrochemistry*, May 2017.

Krzysztof Rokosz, 'High-current-density electropolishing (HDEP) of AISI 316L (EN 1.4404) stainless steel' *Technical Gazette*, 22, Jan. 2, 2015, pp. 415-424.

Feroze Nazneen et al., 'Electropolishing of medical-grade stainless steel in preparation for surface nano-texturing' *Journal of Solid State Electrochemistry*, 16, Apr. 4, 2012, pp. 1389-1397.

International Preliminary Report on Patentability dated Jun. 29, 2020, issued in corresponding International Application No. PCT/AU2020/050280.

Written Opinion dated May 1, 2020, issued in corresponding International Application No. PCT/AU2020/050280.

Extended European Search Report dated Dec. 13, 2022, issued in corresponding European Patent Application No. 20786232.7.

Office Action and Search Report dated Aug. 29, 2023, issued in corresponding Chinese Patent Application No. 202080025570.X.

* cited by examiner (A)

(B)

(A)

(B)

(A)

(B)

(A)

(B)

ELECTROPOLISHING METHOD

PRIORITY CROSS-REFERENCE

This application is a national phase under 35 U.S.C. § 371 of PCT International Application No. PCT/AU2020/050280, which has an international filing date of Mar. 24, 2020, which claims priority to Australian Provisional Patent Application No. 2019901205 filed at the Australian Patent Office on 9 Apr. 2019, the entire contents of each of which are incorporated into the present specification by this reference.

TECHNICAL FIELD

The present invention generally relates to an electropolishing method for smoothing the surface of a manufactured metallic article. The invention is particularly applicable to surface finishing of metal alloys that are additively manufactured (3D printed), and in particular metals and metal alloys with protective oxide layers such as chromium containing alloys, titanium and titanium alloys, nickel alloys such as nitinol, and aluminium and aluminium alloys and it will be convenient to hereinafter disclose the invention in relation to that exemplary application. However, it should be appreciated that the invention is not specifically limited to additively manufactured (3D printed) metal and metal alloy products and can be applied to a wide variety of metallic (metal and metal alloy) articles produced from a variety of manufacturing methods that require electropolishing to smooth the surface of that metallic article.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Additive manufacturing usually provides articles with a wide range of surface roughness or surface finish typically having an average surface roughness Ra-values above 2 µm, typically above 5 µm (macro-finish), and usually 8 to 20 µm Ra-values. Such additively manufactured parts need to be polished or otherwise machined to reduce their initial surface roughness to acceptable values required for a specific application.

Mechanical methods such as lapping, grinding and polishing can reduce the initial average surface roughness of articles down to a micro-finish level (typically 0.01<Ra<2.00 µm). These methods are time consuming and generally manual, which makes it prone to errors and very costly. Current polishing times typically exceed an hour using manual labour. Moreover, these methods can have uniformity limitations when used in complex-shaped components. In addition, if the initial surface roughness is high, several grinding/polishing steps may be required to achieve the desired final surface roughness.

Electropolishing is an alternate finishing technique suitable for finishing and polishing metallic components which may be difficult to polish by conventional methods. Electropolishing uses direct current and a conductive electrolyte to remove particle from metal surfaces. The existing state of the art uses DC current at a voltage that is primarily stable, or an addition of a relatively small component of AC, being less than 20% of the DC voltage. Removal rates (current) are usually between 0.25 to 0.50 A/cm² based on the surface area of the metallic component. The reduction in surface roughness is typically from 1.5 µm to 0.7 µm Ra over a process time of 30 to 60 minutes. The speed of material removal can be slow with electropolishing amperage generally ranging from 10 to 200 mA/cm². Due to the slow reduction speed and small particle removal rate this process requires at least one other manual polishing or alternate finishing process to bring the part to an acceptable surface before electropolishing is viable. Examples of pretreatment processes used to reduce chemical finishing time include CNC machining, tumbling, vibration systems, heat treatment, shot peening, sanding, bead blasting or laser remelting. Post-treatment can require manual mechanical finishing as well.

Conventional electropolishing also typically uses a combination of highly concentrated acid solutions including combinations of hydrofluoric acid, nitric acid, sulphuric acid, and phosphoric acid. Such electrolytes are not environmentally friendly and can have disposal issues.

Nevertheless, electropolishing systems have been developed for polishing additive manufactured surfaces. One example is in United States patent publication No. US20190345628A1 which teaches a method for the electrochemical polishing 3D printed surfaces of products made from steel, nickel-based alloys, aluminium alloys, magnesium alloys or titanium alloys, by means of repeating pulse sequences in which at least one anodic pulse is provided, the current intensity of which rises continuously in the time curve up to a specifiable value. Further higher-frequency micropulses can be used that follow the first anodic pulse, which are interrupted by a pulse pause and/or by at least one cathodic pulse. The average current density of the electropolishing regime is preferably 0.005 A/cm² to 0.3 A/cm², with the pulses having a pulse length of 0.0005 s to 5 s, with a frequency of 0.2 Hz to 2 kHz.

Whilst providing reasonable electropolishing results, the system of US20190345628A1 does not operate outside the trans-passive range on the voltage-current curve to avoid the complete breakdown of the passive or polishing film layer and its properties which can cause potential streaking, gas production issues, heat issues etc.

It is therefore desirable to provide an alternate or improved method of finishing and/or polishing metallic articles, preferably rough metallic articles, and in particular metallic articles (metal or metal alloy) having a protective oxide layer such as chromium containing metallic alloys.

SUMMARY OF THE INVENTION

The present invention provides an electropolishing technique that can be applied to metallic articles (metal or metal alloy) having a protective oxide layer, such as aluminium, aluminium alloys, titanium, titanium alloys, nickel alloys such as nitinol and chromium containing metal alloys such as stainless steel and Inconel. The electropolishing technique can be applied to metallic articles with rough surfaces and achieves excellent reduction in surface roughness in a more rapid manner than conventional electropolishing methods.

A first aspect of the present invention provides a method for electropolishing a manufactured metallic article, the method comprising:

contacting the metallic article with an electropolishing electrolyte; and electropolishing the metallic article in the electropolishing electrolyte through the application of an applied current regime comprising: at least one electropolishing regime comprising a current density of at least 2 A/cm² and a voltage having a shaped waveform having a frequency from 2 Hz to 300 kHz, a minimum voltage of at least 0 V and a maximum voltage of between 0.5 to 500 V.

The present invention provides an electropolishing method capable of rapid polishing resulting surface finish free of a heterogeneous texture and/or exhibiting a considerably lower average surface roughness value after the electropolishing. The electropolishing method of the present invention uses a high current density of 2 A/cm² or greater to rapidly remove material. The electropolishing method of the present invention also uses a shaped waveform voltage that varies the voltage (and current) delivered to the object being treated from approximately, or close to, zero volts, or the lowest voltage supplied to the object during the regime, to the full voltage supplied to the object during the regime, in the range of 0.5V to 500V. The waveform is delivered at a frequency in the range of 2 Hz to 300 kHz. This current density and voltage waveform enable high amounts of material to be removed from the treated surface or surfaces of the metallic article at a rapid rate.

Unlike prior art processes, the present invention does not avoid operating outside the trans-passive range on the voltage-current curve. In the present invention, the current density and voltage is selected to blast the passive layer away (which is formed in the trans-passive range) at the very start of the process. Using controlled frequency, voltage, current, temperature and chemistry the present invention is able to deal with all the issues caused by operating outside of the standard accepted voltage-current limits.

Whilst a single applied current regime can be used, better results are used when at least two current regimes are used during electropolishing. In these embodiments, the method of the present invention comprises at least two electropolishing regimes, and more preferably at least three electropolishing regimes, each electropolishing regime comprising a current density of at least 2 A/cm² and a voltage having a shaped waveform having a frequency from 2 Hz to 300 kHz, a minimum voltage of at least 0 V and a maximum voltage of between 0.5 to 500 V, and wherein at least one of the frequency, the current density (current), or maximum voltage of each electropolishing regime is changed compared to the preceding electropolishing regime.

The inventor has realised that prolonged application of a high electropolishing current can leave indents and streaks in the surface. An applied current regime having two or more electropolishing regimes is therefore used to assist in achieving a fine finish. The effect of the applied current regime is enhanced by using two or more electropolishing regimes and changing, for example stepping (up or down) one or more of the frequency, the current density (current), or the maximum voltage compared to the preceding electropolishing regime. Whilst not wishing to be limited to any one theory, the inventor considers that at the start of a regime, the material removal rate is high. Within less than a minute a diffusion layer forms on the surface of the material being treated. The diffusion layer appears to act in a similar way to an insulator or resistive load. This diffusion layer significantly reduces the speed of material removal and, if it is not removed, the process speed degrades significantly. Maximum voltage, current density (current) and frequency are varied to disturb the diffusion layer around the part being electropolished and re-establishes the high speed of material removal. The improved speed still maintains results that can preferably bring a coarse surface (>2 μm Ra, typically >5 μm Ra), to below 2 μm Ra surface roughness in less than 10 minutes, preferably less than 5 minutes, typically less than 2 minutes, and in some cases less than 1 minute.

The present invention uses changes, typically stepped changes, in frequency, voltage and/or current density to upset the rapidly forming diffusion layer which forms adjacent to the part after a short period of time on any given set of parameters (frequency, voltage, current density). However, it should be appreciated that the present invention can use frequency, voltage, current/current density, temperature, and chemistry to manage all the variables and allows stripping (electropolishing) of particles in a uniformed manner from the surface of the metallic article.

The diffusion layer is very dense compared with the rest of the electrolyte. The diffusion layer slows the transfer of electrons and elemental particle through what can be described as a "dense soup of electrolyte and metal particle" in a layer around the metallic article. By changing the parameters (frequency, voltage, current density) the dense layer around the metallic article is constantly replaced with the fresh electrolyte and the high current pulse at the start of each step creates an extra intense gas generation which also assists in removing the diffusion layer from its position adjacent to the metallic article.

At least one of the maximum voltage, current density (current) or frequency is changed between each electropolishing regime. In most instances this comprises stepping one or more of the maximum voltage, the current density (current) or the frequency up or down compared to the preceding electropolishing regime.

The electropolishing regimes are also preferably designed to progressively electropolish the metallic article with decreasing intensity to enable a fine finish. Thus, each successive electropolishing regime preferably has at least one of: a generally lower maximum voltage or a generally lower current density than the preceding electropolishing regimes (i.e. overall lower in a downwards trending pattern, though individual regimes may vary from that pattern and have a higher component).

The voltage and current are applied in electropolishing regimes of differing maximum voltage/current levels and different frequencies. It should be appreciated that the voltage used determines the current flow and can be considered to be one variable. The voltage/current determines the amount of material removed. Where multiple electropolishing regimes are used, the initial electropolishing regimes have high maximum voltage (thus high current/current density) to remove high amounts of material quickly. This reduces the surface roughness in very rough materials to a moderately smooth roughness very quickly. Maximum voltage/current density can be reduced in subsequent electropolishing regimes to obtain increasingly finer results. Hence, the optimal surface finishing process is a series of electropolishing regimes with initially high, but then decreasing maximum voltage/current for increasingly smoother and finer finishes. In embodiments, the high voltage/current typically has a current density greater than 5 A/cm², preferably greater than 7 A/cm², more preferably greater than 10 A/cm². It should be appreciated that the corresponding voltage is dependent on the conductivity of the electrolyte.

At a very high current density (>10 A/cm²) particle/material removal from the surface of the metallic article is very rapid, aggressive and volatile, often making the metal surface of the metallic article slightly pitted or uneven (or on low frequency causing streaks). The present invention uses a high current density compared to prior electropolishing methods to remove bulk material. The electropolishing process can then be preferably enhanced by slowly stepping the current down to leave the product with a smooth uniformed surface, as described in more detail below.

Any number of electropolishing regimes can be used in the electropolishing step. In some embodiments, the electropolishing step includes at least 3 electropolishing regimes, preferably at least 4 electropolishing regimes, more preferably at least 10 electropolishing regimes, and yet more preferably at least 20 electropolishing regimes. In some embodiments, the electropolishing step includes more than 40 electropolishing regimes. In other embodiments, the electropolishing step includes 3 to 10 electropolishing regimes. In embodiments, the electropolishing step includes 3 to 6 electropolishing regimes. Each successive electropolishing regime is preferably applied with a different frequency to the preceding electropolishing regime. However, it should be appreciated that in some cases, one or more successive electropolishing regime could be applied with the same frequency as the preceding electropolishing regime.

The electropolishing method of the present invention is rapid (at least five to ten times faster than conventional electropolishing methods), preferably providing a reduction in average surface roughness to less than Ra of 2 µm in less than 10 minutes, preferably less than 5 minutes, and more preferably less than 2 minutes and in some embodiments no more than 1 minute. The electropolishing method of the present invention provides an even polish, is precise and is scalable. Such an electropolishing treatment may be of great interest for engineering manufacturing processes in which the resulting article has a very rough and uneven surface texture (such as 3D printed components, coarsely blasted surfaces, very rough sintered parts).

The total duration of all electropolishing regimes is preferably less than 10 minutes, and more preferably less than 5 minutes. In some embodiments, the total duration all electropolishing regimes is preferably less than 3 minutes, more preferably less than 2 minutes, and yet more preferably no more than 60 s. To achieve this, each electropolishing regime may be applied for a duration of 1 to 30 s, preferably 1 to 20 s, more preferably 1 to 15 s. In some embodiments, each electropolishing regime may be applied for a duration of 2 to 30 s, preferably 2 to 20 s, more preferably 2 to 15 s.

The applied current regimes are applied for a period effective to cause the roughness of the metallic article to be reduced. The applied current regime range of voltages/currents (current density) and frequencies that have been pre-determined to be optimum for the part and the material to be polished.

A suitable DC or pulsed power supply (voltage or current controlled) is used to polarise both electrodes (i.e. the cathode and the anode/metallic article). The current and the associated current density of the applied current regimes affect the material removal rate and thus electropolishing speed of the metallic article. The current is at least 0.1 A. The associated current density is at least 2 A/cm$^2$, preferably at least 1.0 A/cm$^2$, more preferably at least 5 A/cm$^2$. In some embodiments, the current density is from 2 A/cm$^2$ to 200 A/cm$^2$, preferably 20 to 50 A/cm$^2$. In some embodiments, the current density is greater than 22 A/cm$^2$, preferably greater than 25 A/cm$^2$. In some embodiments, the current density is from 25 A/cm$^2$ to 200 A/cm$^2$, preferably 25 to 100 A/cm$^2$. In some embodiments, the current density is from 30 A/cm$^2$ to 200 A/cm$^2$, preferably 30 to 100 A/cm$^2$.

The current can be DC only, AC only, square wave pulse DC, sinusoidal pulsed DC or a mixture thereof. Where a pulsed DC waveform is used it should be appreciated that the applied current waveform is not classic AC and not precisely DC. The waveform can be characterised as a square waveform current that is either an alternating current, or a pulsing DC square wave. In some embodiments, the pulsing DC square waveform has a longer zero current phase compared to the peak or applied current phase. In a number of embodiments, the current comprises a DC current.

The shaped waveform of the voltage can be one of square wave, sinusoidal, pulsed, or a combination thereof. In some embodiments, the shaped waveform current comprises a pulsed width modulation (PWM) waveform, preferably a square wave pulse, preferably having a variable dead time. In some embodiments, the square wave pulse has a variable dead time. In some embodiments, the pulsing square waveform has a longer zero current phase compared to the peak or applied voltage phase.

Materials with protective oxide layers such as titanium and aluminium break down with more speed and at lower maximum voltages by using higher frequency. The frequency of the current is preferably varied in each regime to assist in breaking down the diffusion barrier at the surface of the metallic article being electropolished. The frequency can vary from 2 Hz to 300 kHz (or more in some instances). In some embodiments, the frequency can vary from 200 Hz to 300 kHz, preferably 2 kHz to 300 kHz. In embodiments, the frequency can vary from 2 Hz to 200 kHz, preferably 2 Hz to 150 kHz. In other embodiments, the frequency can vary from 2 kHz to 200 kHz, preferably 2 kHz to 150 kHz. In some embodiments, the frequency is from 10 kHz to 300 kHz, preferably 10 kHz to 200 kHz, more preferably 10 kHz to 150 kHz. In some embodiments, the frequency is from 10 kHz to 100 kHz. In other embodiments, the frequency is from 20 to 300 kHz, preferably 20 to 100 kHz, more preferably from 20 to 90 kHz, and yet more preferably from 40 to 80 kHz. The exact frequency is selected to suit the particular composition of metallic article and the desired surface roughness.

In embodiments, the waveform comprises a change between the maximum voltage and the minimum voltage of at least one of: greater than 80% of the maximum voltage; or greater than 1 V, preferably greater than 2 V, more preferably greater than 3 V. In some embodiments, the waveform comprises a change between the maximum voltage and the minimum voltage of at least one of:
greater than 80% of the maximum voltage; or
greater than 2 V.

In some embodiments, the waveform comprises a change between the maximum voltage and the minimum voltage of at least one of: greater than 80% of the maximum voltage; or greater than 1 V, preferably greater than 5 V, more preferably greater than 10 V, yet more preferably greater than 20 V, yet more preferably greater than 30 V. In some embodiments, the waveform comprises a change between the maximum voltage and the minimum voltage of at least one of:
greater than 80% of the maximum voltage; or
greater than 40 V.

The maximum voltage used in each electropolishing regime is between 0.5 and 500 V. In most embodiments, the maximum voltage is between 1 V and 200 V, preferably 5 V and 150 V, and more preferably 10 V and 100 V. In particular embodiments, the voltage is between 10 to 75 V. The minimum voltage is lower than the maximum voltage and is at least 0 V. In some embodiments the minimum voltage is between 0 and 150 V, preferably between 0 and 100 V, and more preferably between 0 and 50 V. In some embodiments, the minimum voltage is between 0 and 20 V, preferably between 0 and 10 V. In embodiments, the minimum voltage is a voltage close to 0 V (as close as practical for the particular power supply) i.e. substantially 0 V or approximately 0 V.

Where the current density is changed between successive electropolishing regimes, the current density can be changed, preferably stepped up or down compared to the preceding electropolishing regime. In embodiments, that change in current density is typically at least 1 A/cm$^2$, preferably at least 2 A/cm$^2$, and more preferably from 2 to 200 A/cm$^2$. In some embodiments, that current density is changed between 1 to 100 A/cm$^2$, more preferably between 1 to 50 A/cm$^2$.

The electropolishing step may include one or more cooling regimes following one or a number of the electropolishing regimes. In embodiments, the electropolishing step includes at least one cooling regime comprising lowering the current density following at least one electropolishing regime. The cooling regime may follow only one electropolishing regime, a number of electropolishing regimes, or in some cases each electropolishing regime. Where the current density is lowered, it is preferably lowered to at most half the current density of the preceding electropolishing regime, more preferably at most one quarter of the current density of the preceding electropolishing regime. The lowered current density can be 0.5 or less, 0.4 or less, 0.3 or less, 0.2 or less or even 0.1 or less the current density of the preceding electropolishing regime. In some embodiments, the current density is lowered to close to or equal to zero current density. The cooling regime can be applied for any suitable timeframe. In some embodiments, each cooling regime is applied for a duration of at least 0.5 s, more preferably at least 1 s. In embodiments, the cooling regime is applied for 1 to 10 s, preferably 1 to 5 s. The cooling regime has a reduced current density compared to the preceding electropolishing regime, and thus reduced current applied to allow the metallic article and cathode to cool. This can be advantageous in certain embodiments, for example in non-submerged methods (see below) where the metallic article is connected to the positive terminal of a power supply thereby becoming an anode and the cathode comprises a suitable conducting electrode, for example a conductive brush, is connected to the negative terminal of the power supply. In these embodiments, the cooling time is aimed at cooling the metallic work piece, although there is also a benefit from cooling the brush electrode.

Exemplary embodiments of the present invention include an initial pulse which precedes the electropolishing regimes. In these embodiments, the electropolishing step includes application of an applied current regime comprising:
(A) an initial pulse comprising a current density of at least 2 A/cm$^2$ and a voltage comprising a shaped waveform having a frequency from 20 to 300 kHz, a minimum voltage of at least 0 V and a maximum voltage of between 50 to 500 V, applied for a duration of at least 1 s; followed by
(B) at least one electropolishing regime comprising a current density of at least 2 A/cm$^2$ and a voltage comprising a shaped waveform having a frequency from 2 Hz to 300 kHz, a minimum voltage of at least 0 V and a maximum voltage of between 0.5 to 500 V.

By initially blasting the part with high current density the present invention instantly removes the passive/polishing film layer that protects the metallic article from attack. In this state, the metallic article is very susceptible to chemical and atmospheric attack. The present invention uses frequency, voltage, current, temperature, and chemistry to manage all the variables and allows stripping of particles in a uniformed manner from the surface of the metallic article.

In preferred embodiments, the electropolishing step includes application of an applied current regime comprising:
(A) an initial pulse comprising a current density of at least 2 A/cm$^2$ and a voltage comprising a shaped waveform having a frequency from 20 to 300 kHz, a minimum voltage of at least 0 V and a maximum voltage of between 50 to 500 V, applied for a duration of at least 1 s; followed by
(B) at least two electropolishing regime comprising a current density of at least 2 A/cm$^2$ and a voltage comprising a shaped waveform having a frequency from 2 Hz to 300 kHz, a minimum voltage of at least 0 V and a maximum voltage of between 0.5 to 500 V, wherein the frequency and/or maximum voltage of each electropolishing regime is changed compared to the preceding electropolishing regime.

In some embodiments, the initial pulse has a current density of greater than 5 A/cm$^2$, preferably greater than 7 A/cm$^2$, more preferably greater than 10 A/cm$^2$.

Whilst not wishing to be limited to any one theory, the inventor considers that the initial pulse removes any partially bonded material on the metallic article, and the subsequent sequence of electropolishing regime (or regimes) electropolish the metallic article resulting in an electropolished surface which is preferably even, smooth and lustrous. In some cases, the initial high current/voltage pulse melts or otherwise severs the attachment point between that partially bonded material and the base material. Electropolishing preferably requires that the surface is clean and generally free of contaminants. The initial pulse therefore advantageously removes debris from the surface of the metallic article. For 3D printed articles, such debris can be present as artefacts from the 3D printing process. This advantageously reduces possible asperities (peaks) on the work surface which are dissolved much faster than the material in "microvalleys" during electropolishing.

The initial pulse is intended to provide a large maximum voltage and current capable of removing any debris attached to or otherwise partially bonded material on the metallic article. The pulse is intended to be applied for a short time frame (i.e. seconds). In this respect, the initial pulse is applied for a short time frame/duration of between 1 to 20 s, preferably 2 to 15 s, more preferably 2 to 10 s, and yet more preferably 2 to 5 s. Moreover, the maximum voltage of the initial pulse is preferably greater than the maximum voltage of each of the successive electropolishing regimes. Similarly, the current density of the initial pulse is preferably greater than the current density of each of the successive electropolishing regimes. In embodiments, the initial pulse has a current density of at least 1.0 A/cm$^2$, more preferably at least 5 A/cm$^2$. In some embodiments, the initial pulse has a current density of 2 A/cm$^2$ to 200 A/cm$^2$, preferably 20 to 50 A/cm$^2$. In some embodiments, the initial pulse has a current density greater than 22 A/cm$^2$, preferably greater than 25 A/cm$^2$. Furthermore, it is preferred for the applied frequency of the alternating voltage of the initial pulse to be different to the applied frequency of each of the successive electropolishing regimes. In some embodiments, the applied frequency of the alternating voltage of the initial pulse is less than the applied frequency of each of the successive electropolishing regimes. In some embodiments, the applied frequency of the alternating voltage of the initial pulse is greater than the applied frequency of each of the successive electropolishing regimes.

The frequency of the initial pulse can vary from 20 Hz to 300 kHz (or more in some instances). In some embodiments, the frequency can vary from 200 Hz to 300 kHz, preferably 2 kHz to 300 kHz. In embodiments, the frequency is from 20 kHz to 150 kHz. In some embodiments, the frequency is from 20 kHz to 100 kHz. In other embodiments, the frequency is from 30 to 100 kHz, preferably from 30 to 90 kHz, more preferably from 40 to 80 kHz.

The maximum voltage used in each initial pulse is between 50 and 500 V. In most embodiments, the maximum voltage is between 50 V and 200 V, preferably 50 V and 150 V, and more preferably 50 V and 100 V.

Embodiments of the present invention can therefore provide a method for electropolishing a manufactured metallic article, the method comprising:

contacting the metallic article with an electropolishing electrolyte; and electropolishing the metallic article in the electropolishing electrolyte, wherein the electropolishing step includes application of an applied current regime comprising:
(A) an initial pulse comprising a current density of at least 2 A/cm$^2$ and a voltage comprising a shaped waveform having a frequency from 20 to 300 kHz, a minimum voltage of at least 0 V and a maximum voltage of between 50 to 500 V, applied for a duration of at least 1 s; followed by
(B) at least two electropolishing regime comprising a current density of at least 2 A/cm$^2$ and a voltage comprising a shaped waveform having a frequency from 2 Hz to 300 kHz, a minimum voltage of at least 0 V and a maximum voltage of between 0.5 to 500 V, applied for a duration of at least 1 s, wherein the frequency and/or maximum voltage of each electropolishing regime is changed compared to the preceding electropolishing regime.

In particular embodiments, the electropolishing step includes application of an applied current regime characterised by an initial pulse comprising a voltage having a shaped waveform having a frequency from 30 to 50 kHz, having a maximum voltage of between 60 to 700 V, preferably 65 V, applied for a duration of 3 to 7 s, preferably 5 s, followed by at least two electropolishing regimes comprising a voltage having a shaped waveform having a frequency from 50 to 70 kHz, preferably 63 kHz, a maximum voltage of between 10 to 60 V applied for a duration of 5 to 30 s, wherein successive electropolishing regime have a lower maximum voltage than the preceding electropolishing regime.

The electropolishing method of the present invention is particularly applicable to electropolishing metallic articles comprising a metal or metal alloy that has a protective oxide coating. Examples of these metal or metal alloys include one of a chromium containing metal alloy, titanium, a titanium alloy, nickel alloys such as nitinol, aluminium or an aluminium alloy. In some embodiments, the metallic articles are formed from a chromium containing metal alloy. Such materials have a chromium oxide protective outer layer. It should be appreciated that chromium containing metal alloy is a metal alloy that includes chromium as a major or main alloying element in the alloy composition. Various metal alloys that include chromium fall into this group. Exemplary examples include metal alloys selected from iron-chromium alloy, nickel-chromium (nickel-chrome), nickel-chromium alloys, cobalt-chromium alloys, or cobalt-chromium-molybdenum alloys. In some embodiments, the chromium containing alloy comprises an iron-chromium alloy, for example a stainless steel. In some embodiments, the chromium containing alloy comprises a nickel-chromium alloy, for example Inconel. In particular embodiments, the chromium containing metal alloy comprises a cobalt-chromium alloy. In some embodiments, Co—Cr alloys further include molybdenum and nickel alloying elements. The Co—Cr alloy may include further minor alloying elements (less than 1 wt %) such as Mn, Ni, Fe, C, Ti, S, P, N and W. However, it should be appreciated that the present invention can be used with other metallic articles formed from aluminium or aluminium based alloys, titanium and titanium based alloys.

The electropolishing electrolyte can be any suitable conductive liquid. In preferred forms the electropolishing electrolyte includes $H_3PO_4$. The electropolishing electrolyte preferably comprises a solution including phosphoric acid in solution based on water or a $C_1$-$C_4$ alcohol. The electropolishing electrolyte may comprise a solution of phosphoric acid ($H_3PO_4$) as the sole component acid, or in combination with other chemicals, for example other acids. For example, embodiments of the electropolishing electrolyte may include phosphoric acid in combination with one or more of sulfuric acid ($H_2SO_4$), hydrochloric acid (HCl), and in combination with one or more of water or a $C_1$-$C_4$ alcohol. In one form, the electrolytic solution comprises an 85% aqueous solution of phosphoric acid. However, the composition depends of the ionic content and other variables including voltage, current and temperature of the electropolishing electrolyte.

In exemplary embodiments, the electropolishing electrolyte is a food-grade (safe) electrolyte bath. Any suitable conductive liquid could be used. In embodiments, the electropolishing electrolyte comprises phosphoric acid in combination with one of water or a $C_1$-$C_4$ alcohol. In embodiments, the electropolishing electrolyte comprises an aqueous phosphoric acid solution.

Solution concentrations of acid, in particular phosphoric acid, in the electrolyte may vary from 1% to 90% (i.e. 1 g to 90 g of compound in 100 ml of water), preferably from 10% to 90%. Solution concentration depends on type of metallic article to be treated (e.g. stainless steel, cobalt-chromium alloys, Ni—Cr alloys or the like) and electrolytic treatment time. In one embodiment, 85% phosphoric acid solution is used.

The pH of the electropolishing electrolyte can be between 1 and 14 depending on its composition. In some embodiments, the pH of the electropolishing electrolyte during the electropolishing method of the present invention is preferably between 1.0 to 7.0, more preferably between 1.0 to 3.0. In one embodiment, the pH of the electropolishing electrolyte is around 1.5.

The electropolishing electrolyte temperature should be maintained from −25 to 200° C., preferably from 0 to 150° C., more preferably 50 to 100° C., and yet more preferably 60 to 90° C. Again, the electropolishing electrolyte temperature dependent on the composition of the electropolishing electrolyte. For example, as you get up to 85% phosphoric solution the electropolishing electrolyte is viscous. Thus, the higher the temperature of the electropolishing electrolyte, the better the electrolyte works. Conduction is better at lower concentration, but the resulting lustre of the resulting metallic article is not as good. It should also be appreciated that current density is temperature dependent and varies based on the concentration and composition of the electropolishing electrolyte and therefore the temperature.

In order to maintain the treatment temperature range, cooling methods are normally required. The metallic article may be cooled through various methods including but not limited to heat sink, gas flow or liquid flow cooling. The electropolishing electrolyte is preferably maintained at a temperature of between 50 to 100° C., more preferably 60 to 90° C. typically by electrolyte flow to or through a heat exchanger. In some embodiments, a convective cooling means, such as a fan, directed to the electropolishing electrolyte could be used. However, in preferred embodiments, a heat exchanger can be immersed in the electropolishing electrolyte. For example, in a small scale (laboratory or development scale) this may comprise a water/ice water bath in which a beaker containing electrodes and electropolishing electrolyte is immersed. In a large scale (i.e. commercial/industrial process) this may comprise re-circulation of the electropolishing electrolyte and cooling thereof by means of a suitable cooling/heat exchange unit. Additionally, one or more filters may be used to collect metal/metal oxide debris from the electropolishing electrolyte.

A post electropolishing chemical wash may be required to remove any loose material compounds lying above the alloy surface, to allow the natural passive layer to reform around the metal alloy.

The process can include any number of process automation steps. For example, in some embodiments an automated (robotic) arm can be used to control the position and movement of the workpiece in the bath during the electropolishing method. In some embodiments, one or more robotic arms could be used to hold both the component and/or the electrode (for example a brush or pad for non-submerged electropolishing) during the electropolishing method.

The electropolishing method of the present invention can be applied to a metallic article having any particular surface roughness, for example less than Ra of 2 μm or even less than a Ra of 1 μm could equally be electropolished using the electropolishing method of the present invention as a metallic article with a rough surface, for example having a Ra greater than 2 μm or even 5 μm. In particular embodiments, the electropolishing method of the present invention can be used to reduce the average surface roughness of rough metallic articles characterised by a region having an initial average surface roughness (Ra) of greater than 2 μm to below 2 μm Ra surface roughness. The metallic article or relevant part thereof has an initial roughness (Ra) of greater than 2 μm, preferably greater than 5 μm (Ra is the arithmetical average of roughness), and in some cases greater than 10 μm Ra. In most embodiments, substantially all of the metallic article has an initial average surface roughness (Ra) of greater than 2 μm. However, it should be appreciated that only a part of the metallic article has this roughness value in need of treatment in some embodiments. It should also be appreciated that the method of the present invention is suitable for application to one or more manufactured metallic articles immersed in the electrolyte at the same time. The initial roughness (Ra) of the manufactured metallic article is also generally less than 400 μm, more preferably less than 300 μm, most preferably less than 200 μm.

The initial roughness of the manufactured metallic article can be the result of being manufactured by any one of the following methods: sand casting, investment casting, additive manufacturing, metal cutting (sawing, shaping, drilling, milling, turning), hot rolling, forging, flame cutting. However, it should be appreciated that this list is not limiting, and that the method of the present invention can apply to a variety of manufacturing methods. A list of suitable manufacturing techniques and the Ra roughness levels these techniques typically produce is as follows:

Additive Manufacturing, Ra=10 to 50 μm.
Sand casting, Ra=100 to 900 μm.
Investment casting, Ra=2 to 10 μm.
Metal Cutting (sawing, shaping, drilling, milling, turning), Ra=2 to 25 μm.
Hot rolling, Ra=12 to 25 μm.
Forging, Ra=3 to 12 μm.
Flame cutting, Ra=12 to 25 μm.

Electropolishing aims at a resulting surface finish free of a heterogeneous texture and/or exhibiting a considerably lower surface roughness value compared to its initial surface roughness value.

Suitable metrology methods to quantify surface roughness include surface stylus profilometry (from which Ra and Rz parameters are derived from a profile (line)) and 3D-optical surface profilometry (from which Sa and Sz parameters are derived from a surface area).

Suitable manufactured metallic articles to be treated in this invention can comprise a chromium containing metal alloy. As indicated previously, these alloys include iron-chromium alloys such as stainless steels, nickel-chromium (nickel-chrome) and its alloys, cobalt-chromium alloys, cobalt-chromium-molybdenum alloys. In preferred embodiments, the manufactured metallic article comprises a cobalt-chromium alloy.

The metallic article provides the anode of the electropolishing circuit. A cathode is also required to complete the electrical circuit. Suitable metal materials for the cathode include stainless steel, lead, copper or any other metal or conductive material which exhibits good conductivity and corrosion resistance. In some embodiments, the cathode comprises a carbon based material for example a carbon fibre based material. In some embodiments, the cathode is the electrolytic tank/container in which the at least one anode metallic article (i.e. rough parts to be treated) is immersed in the electropolishing electrolyte solution (electrolytic solution). In other embodiments, the cathode comprises a separate conductive material article immersed in the electropolishing electrolyte. The cathode surface is preferably 2 to 20 times greater than that of the anode surface area (i.e. metallic article surface area), and more preferably 5 to 10 times greater.

It should be appreciated that the size of the metallic article (part size) and apparatus treated by the method of the present invention is scalable as the applied current regime and be applied using a control system that can run multiple inverter power banks in parallel to achieve the desired output current/current density. The method of the present invention can therefore be equally applied to finish a part the size of a golf ball from a starting surface roughness of 10 Ra to less than 2 Ra (in some cases less than 0.5 Ra, and in some embodiments less than 0.05 Ra, and even less than 0.02 Ra) and also a part the size of a car by scaling up the size of the electrolytic cell, electrolytic reservoir or bath containing the electropolishing electrolyte and the inverter for applying the applied current regime.

The electropolishing method of the present invention can be conducted in a conventional electropolishing cell where the metallic article is immersed in the electropolishing electrolyte, or in non-immersed techniques, for example brush applied electropolishing techniques.

In some embodiments, the electropolishing electrolyte is contained in an electropolishing cell. In such embodiments, the metallic article is immersed in the electrolyte and electropolishing takes place within the confines of the electrolyte and receptacle/container which holds the electropolishing electrolyte. In this type of conventional electropolishing the metallic article is connected to the positive terminal of a power supply thereby becoming an anode, in the electrolyte bath. A cathode, comprising a suitable metal (typically in plate form) is immersed in the electrolyte bath and is connected to the negative terminal of the power supply thereby becoming the cathode for ionic conduction. In submerged electropolishing or surface finishing the current densities used in the method of the present invention is greater than 2 A/cm², preferably greater than 1 A/cm², more preferably greater than 5 A/cm².

In other embodiments, the electropolishing is applied as a fluid flow onto the surface of the metallic article. Such electropolishing techniques are known as a non-submerged electropolishing technique, and generally involve a flow of electropolishing electrolyte being applied to the surface of the metallic article and a conducting electrode being immersed in the electropolishing electrolyte and moving across the surface to electropolish the surface surrounding the conducting electrode. Such electropolishing techniques can use a conductive brush, a sponge, a pad or any device or material that applies an electrolytic fluid, or fluid-like material, to the metallic article.

In this non-submerged method, the metallic article is connected to the positive terminal of a power supply thereby becoming an anode. A cathode comprising a suitable conducting electrode connected to the negative terminal of the power supply. The conducting electrode is configured to be engaged with a selected portion of the surface of the metallic article. The method of the present invention therefore also includes the step of:

contacting the surface of the metallic article with the conducting electrode.

In some embodiments, the conducting electrode comprises a carbon fibre brush. However, any suitable conductor (for example copper or the like) can be used. In use, electrolyte is fed (typically pumped from a reservoir) to the selected portion of the surface of the metallic article to immerse part of the cathode and surface of the metallic article and therefore form an electropolishing cell on the surface of the metallic article. Coolant can be supplied to cool the electropolishing area. Examples of this electropolishing technique are taught in patent publications No. WO2009/105802, AU2013242795A1 and AU2017204328A1 the contents of which should be considered to be incorporated into this specification by this reference.

In non-submerged electropolishing or surface finishing, the current densities used in the method of the present invention is greater than 5 A/cm², preferably greater than 10 A/cm², more preferably greater than 20 A/cm², yet more preferably greater than 22 A/cm², and yet more preferably greater than 25 A/cm². In some embodiments, the current density can be greater than 50 A/cm², preferably greater than 100 A/cm². In embodiments, the current density can be greater than 120 A/cm², preferably greater than 150 A/cm².

The method of the present invention can process a metallic article to:
1. Improve surface hardness.
2. Control and predetermine particle volume removal.
3. Improves corrosion resistance.
4. Reduce surface roughness.
5. Develop surface lustre.
6. Remove partially bonded materials.
7. Remove of contaminants.
8. Provide strong passive layer bonding.
9. Selectively polish area's and ignore other areas of a metal article.
10. Mark or etch a metal article with labels or the like.

It should be appreciated that depending on the current regime, it should be appreciated that embodiments of the electropolishing method of the present invention can leave some craters in the electropolished surface of the metallic article, indicating that such a surface is likely not medical grade. However, such electropolished products can still be used for many applications, for example jet engine parts. Other embodiments, can achieve results smoother than 0.02 Ra, making these products suitable for medical grade applications.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

The present invention provides an electropolishing polishing method that provides a rapid, quality, safe and quantitative finishing method for use with manufactured metallic articles particularly those formed from metals and metal alloys that have a protective oxide coating. Examples of metals and metal alloys that the electropolishing method can be used on include chromium based metallic alloys, such as stainless steel, nickel-chromium (nickel-chrome), nickel-chrome alloys, cobalt-chromium alloys, cobalt-chromium-molybdenum alloys, and also titanium, titanium alloys, nickel alloys such as nitinol, aluminium or aluminium alloys.

Electropolishing of metals and metal alloys that have a protective oxide coating can be difficult as the oxide coating can inhibit normal electropolishing processes. For example, chromium based metallic alloys have a protective chromium oxide layer, aluminium and aluminium based alloys have a protective aluminium oxide outer layer, and titanium and titanium based alloys have a protective titanium oxide outer layer. The method of the present invention assists in overcoming the deleterious effect of that layer when electropolishing these materials.

The present invention is also concerned with improving the surface finish of manufactured metallic articles produced by engineering production methods such as 3D-printing (additive manufacturing), flame cutting, snagging, coarse blasting or the like. The present invention is particularly suitable for additive manufacturing as this produces a rough finish and the present invention can cope with the wide range of geometries that can be produced by this manufacturing method.

When 3D printing metals, the surface is always rough, usually 8-20 roughness average (Ra). For most industrial applications, including jet engines, and medical applications such as implants, the printed item must be polished before it can be used. The conventional finishing method of polishing is time consuming and manual, which makes it prone to errors and very costly. Current polish times typically exceed an hour using manual labour.

The electropolishing method of the present invention can be used produce a smooth finish from a typical roughness 8 to 20 μm Ra to a roughness of 2 μm Ra in under 10 minutes, in some cases in under 3 minutes. The electropolishing method of the present invention is able to rapidly polish and reduce the average surface roughness of these types and other types of metallic articles to produce a surface finish preferably free of a heterogeneous texture and/or exhibiting a lower average surface roughness value.

Figure 1:
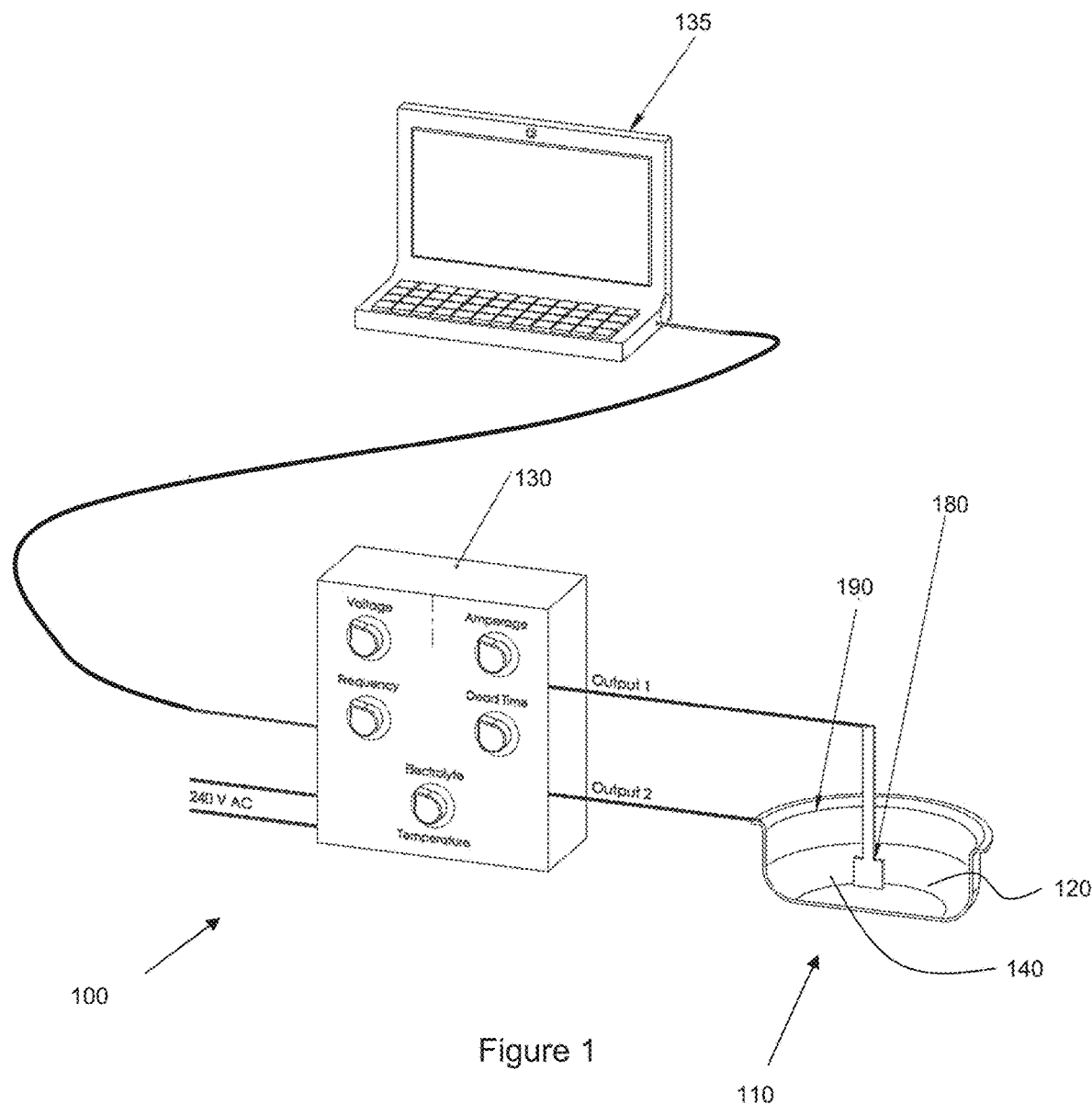
FIG. 1 provides the schematic of an electropolishing apparatus used to run an electropolishing method according to a first embodiment of the present invention.

A schematic of a typical electropolishing apparatus 100 suitable for practicing the electropolishing method of the present invention is illustrated in FIG. 1. The illustrated electropolishing apparatus 100 includes an electrolytic cell 110 having an electrolyte reservoir 120 that is configured to hold an electropolishing electrolyte 140. The electropolishing apparatus 100 also includes an inverter power supply 130 capable of delivering a desired current waveform (DC, DC pulses or variable frequency AC) in short pulses. The inverter power supply 130 is controlled by a computer controller 135.

A metallic article 180 is electrically connected to the positive terminal of the inverter power supply 130, while the negative terminal of the inverter power supply 130 is connected to a cathode 190 which also comprises the container containing the electrolyte 140. It should be appreciated that in other embodiments the cathode 190 could be a separate conductive article. Suitable conductive materials include carbon-based materials such as graphite, graphene, carbon fibre or the like, metallic/metal materials for the cathode 190 include stainless steel, lead, copper or any other material which exhibits good conductivity and corrosion resistance. The metallic article 180 is suspended in the reservoir 120 in the electrolyte 140 forming a complete electrical circuit with the electropolishing electrolyte 140.

Whilst not shown, the electropolishing apparatus 110 may also include a mixing device, for example a mixing rotor for stirring/mixing the electropolishing electrolyte 140 and ensuring even distribution of the electrolyte 140 around the metallic article 180 and the cathode 190.

The computer-controlled inverter power supply 130 is used to apply current and a voltage difference between the metallic article 180 and the cathode 190. The computer 135 runs a program that steps the inverter 130 (power source) through an applied current regime comprising a range of voltages/currents and frequencies that have been pre-determined to be optimum for the particular metallic article 180 and the comprising material to be polished.

Figure 2:
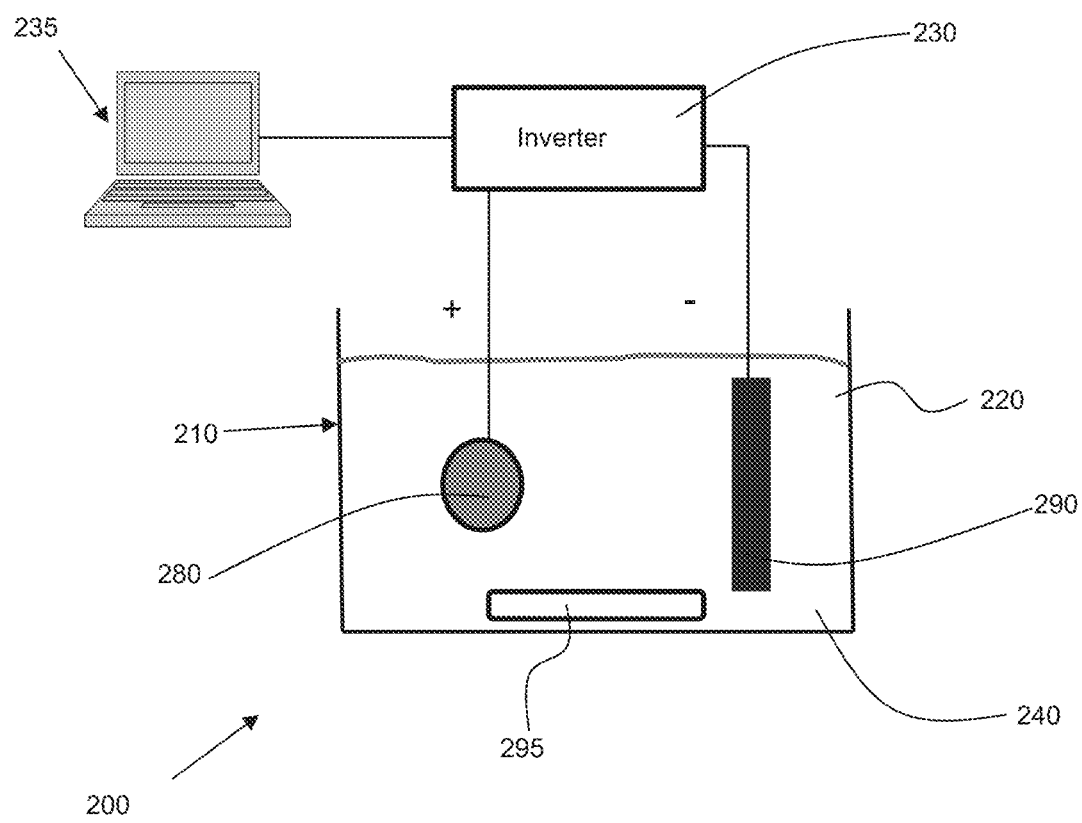
FIG. 2 provides the schematic of an electropolishing apparatus used to run an electropolishing method according to a second embodiment of the present invention.

An alternative schematic of an electropolishing apparatus 200 suitable for practicing the electropolishing method of the present invention is illustrated in FIG. 2. The illustrated electropolishing apparatus 200 also includes an electrolytic cell 210 having an electrolyte reservoir 220 comprising a glass container (or other suitable material) that is configured to hold an electropolishing electrolyte 240 and an inverter power supply 230 capable of delivering a desired current waveform (DC, DC pulses or variable frequency AC) in short pulses. The inverter power supply 230 is controlled by a computer controller 235.

A metallic article 280 is electrically connected to the positive terminal of the inverter power supply 230, while the negative terminal of the inverter power supply 230 is connected to a cathode 290 which in this case comprises a selected metallic article also immersed in the electrolyte 240. Again, suitable metal materials for the cathode 290 include stainless steel, lead, copper or any other metal or conductive material which exhibits good conductivity and corrosion resistance. The metallic article 280 is suspended in the reservoir 220 in the electrolyte 240 forming a complete electrical circuit with the electropolishing electrolyte 240. This form of the electropolishing apparatus 200 includes an optional mixing rotor 295 for stirring/mixing the electropolishing electrolyte 240 and ensuring even distribution of the electrolyte 240 around the metallic article 280 and the cathode 290.

Electropolishing is carried out with the electropolishing electrolyte 140, 240 of the electropolishing apparatus 100 or 200 at a temperature in a range of −25° C. to 200° C., and preferably 0 to 150° C. In embodiments, the electropolishing electrolyte 140, 240 is held at a temperature of about 50° C. to 100° C., preferably 60° C. to 90° C. The electropolishing apparatus 100, 200 may also include a combined temperature probe/heating and cooling unit (not illustrated), which can be attached to a computer controller 135, 235 or a separate controller (not illustrated) to monitor and control the temperature of the electropolishing electrolyte 140, 240.

In each embodiment, the computer-controlled power inverter 130, 230 is used to apply current and a voltage difference between the metallic article 180, 280 and the cathode 190, 290. The computer 135, 235 runs a program that steps the inverter power supply 130, 230 (power source) through an applied current regime comprising a range of voltages/currents and frequencies that have been pre-determined to be optimum for the particular metallic article 180, 280 and the comprising material (metal or metal alloy) to be polished.

The applied current regime broadly comprises the following steps:

(A) an optional initial pulse comprising a current density of at least 2 A/cm$^2$ and a voltage having a shaped waveform having a frequency from 20 to 300 kHz, a minimum voltage of at least 0 V (preferably close to 0 V) and a maximum voltage of between 50 to 500 V, applied for a duration of at least 1 second, followed by:

(B) at least one electropolishing regime comprising a current density of at least 2 A/cm$^2$ and a voltage having a shaped waveform having a frequency from 2 Hz to 300 kHz, a minimum voltage of at least 0 V (preferably close to 0 V) and a maximum voltage of between 0.5 to 500 V. Each electropolishing regime is typically applied for a duration of at least 1 s, preferably at least 2 s. Where two or more electropolishing regimes are used, the frequency and/or maximum voltage of each electropolishing regime is changed compared to the preceding electropolishing regime.

Whilst not wishing to be limited to any one theory, the inventor considers that at the start of a regime, the material removal rate is high. Within less than a minute, a diffusion layer quickly forms on the surface of the material being treated. The diffusion layer appears to act in a similar way to an insulator or resistive load. This diffusion layer significantly reduces the speed of material removal and, if it is not removed, the process speed degrades significantly. A change of at least one of the frequency, the current density (current), or voltage disrupts the diffusion layer and re-establishes the high speed of material removal. A high rate of current density (current) change, voltage change or frequency change sustains a high rate of diffusion layer disruption and therefore allows the process to sustain a very high rate of material removal.

The current (current density) change will usually, but not necessarily, be a reduction in current for the reasons stated above. The frequency change can be either an increase or a decrease. The change in frequency of the waveform is critical to disrupting the diffusion layer in that it need only change frequency between regimes. It may increase or decrease.

Therefore, a high rate of currency (current density) changes and frequency changes, either increasing or decreasing in frequency, allow a much faster surface finishing process. The increase in overall surface finishing speed is in the order of ten times faster when there is a high rate of current or waveform frequency changes.

The optional initial pulse can be used to provide a large maximum voltage and current density capable of removing any loosely attached and/or partially bonded material on the metallic article 180. The pulse is intended to be applied for a short time frame. Accordingly, the maximum voltage and current density of the initial pulse is preferably greater than the maximum voltage and current density of each of the at least one electropolishing regimes.

It is noted that it is possible to use a single electropolishing regime, however, multiple electropolishing regimes will achieve an improved surface finish. The electropolishing regimes are preferably designed to progressively electropolish the metallic article 180, 280 with decreasing intensity. Whilst a single electropolishing regime could be used, it is typical to have at least two electropolishing regimes, with each successive electropolishing regime preferably having a generally lower maximum voltage and current density that the preceding electropolishing regimes. In this respect, the maximum voltage and current density are generally lower in relation to being overall lower in a downwards trending pattern. It should be appreciated that individual electropolishing regimes may vary from that pattern and have a higher component. Where multiple electropolishing regimes are used, the initial electropolishing regimes preferably have high maximum voltage/current to remove high amounts of material quickly. This reduces the surface roughness in very rough materials to a moderately smooth roughness very quickly. Maximum voltage/current can be reduced in subsequent regimes to obtain increasingly finer results. Hence, the optimal surface finishing process is a series of regimes with initially high, but then decreasing voltage/current for increasingly smoother and finer finishes.

Each successive electropolishing regime is preferably applied with a different frequency to the preceding electropolishing regime. However, it should be appreciated that in some cases, one or more successive electropolishing regime could be applied with the same frequency as the preceding electropolishing regime.

Each electropolishing regime could be optionally followed by a cooling regime in which the current density is lowered compared to the current density of the preceding electropolishing regime. The lowered current density can be 0.5 or less, 0.4 or less, 0.3 or less, 0.2 or less or even 0.1 or less the current density of the preceding electropolishing regime. In some embodiments, the current density is lowered to zero (or close to zero) current density/applied current. The cooling regime may follow only one electropolishing regime, a number of electropolishing regimes, or in some cases each electropolishing regime. The cooling regime can be applied for any suitable timeframe, for example 0.5 to 5 s. The cooling regime has a reduced current density, and thus a reduced current applied compared to the preceding electropolishing regime to allow the metallic article and cathode to cool.

The shaped waveform of the voltage can be one of square wave, sinusoidal, pulsed, or a combination thereof. In some embodiments, the shaped waveform current comprises a pulsed width modulation (PWM) waveform, preferably a square wave pulse, preferably having a variable dead time. It should be appreciated that whilst a square waveform is used in the preceding examples, other waveforms could equally be used.

The total duration all electropolishing regimes is preferably less than 10 minutes, more preferably less than 5 minutes, and if possible less than 2 minutes. However, the total time is generally dependent on the type of material and other conditions. To achieve this, each electropolishing regime may be applied for a duration of 10 to 60 s, preferably 10 to 30 s, more preferably 10 to 20 s, yet more preferably 10 to 15 s.

The exact applied current regime is tailored for each particular metal or alloy composition and configuration.

As noted above, the Inventor considers that when used, the initial high pulse current/current density removes the partially bonded material. This is advantageous for electropolishing as asperities (peaks) on the work surface are dissolved much faster than the material in "micro-valleys". Such selective dissolution is a result of different values of the electrical potential of the peaks and valleys. The positive charge of the anodically connected metallic article is concentrated in the peaks where the current density is higher than average which causes a selective dissolution of the peaks and smoothening the surface. Accordingly, the removal of any partially bonded material aids in the production of a smooth surface.

The sequence of frequency, current (current density) and voltage changes (steps) of the electropolishing regime or regimes are selected to electropolish the part to leave an even, smooth and lustrous polished surface. It should be appreciated that that electropolishing method of the present invention can leave some craters due to the nature of the initial surface. However, the electropolishing regimes are selected to improve processing speed, to bring a coarse surface (~10 Ra) to below 2 Ra surface roughness in 60 s or less. Expected removal rates (current) fluctuate with feedback data but it is expected that removal rates will be up to 1.0 μm/min to 50 μm/min, preferably from 2 to 30 μm/min.

For a given electropolishing electrolyte, the quantity of metal removed from the metallic article is proportional to the amount of current applied and the time. Other factors, such as the geometry of the metallic article, affect the distribution of the current and, consequently, have an important bearing upon the amount of metal removed in local areas.

The electropolishing electrolyte 140, 240 preferably comprises a phosphoric acid ($H_3PO_4$) based solution, typically of 85% concentration diluted with water of a C1 to C4 alcohol. However, the electropolishing electrolyte 140, 240 may include other components. For example, in some embodiments the electropolishing electrolyte 140, 240 includes phosphoric acid ($H_3PO_4$) in combination with sulfuric acid ($H_2SO_4$), hydrochloric acid (HCl) or combinations thereof, and one of water or a $C_1$-$C_4$ alcohol. Other electropolishing electrolyte compositions are also possible.

Multiple metallic articles 180, 280 (part) can be placed in the same electrolytic cell 110, 210 allowing the method of the present invention to be scalable and cost effective. The part size (size of the metallic article 180) is also scalable as the control system can run multiple inverter power banks in parallel to achieve the desired output current. The method and system of the present invention can equally be configured to electropolish a part the size of a golf ball from a starting surface roughness of 10 Ra to less than 2 Ra and also a part the size of a car by scaling up the electrolyte reservoir 120, 220 (bath) and the inverter power supply 130, 230.

The above electropolishing method is taught as being conducted in a conventional electropolishing cell where the metallic article is immersed in the electropolishing electrolyte, or in non-immersed techniques, for example brush applied electropolishing techniques.

In other embodiments (not illustrated), the electropolishing is applied as a fluid flow onto the surface of the metallic article. Such electropolishing techniques are known as non-submerged electropolishing techniques, and generally involve a flow of electropolishing electrolyte being applied to the surface of the metallic article, and a conducting electrode being immersed in the electropolishing electrolyte and moving across the surface to electropolish the surface surrounding the conducting electrode.

In this non-submerged method, the metallic article is connected to the positive terminal of a power supply thereby becoming an anode. A cathode comprising a suitable conducting electrode is connected to the negative terminal of the power supply. The conducting electrode is configured to be engaged with a selected portion of the surface of the metallic article. In some embodiments, the conducting electrode comprises a carbon fibre brush. However, any suitable conductor (for example metal such as copper or the like) can be used. In use, electrolyte is pumped from a reservoir to the selected portion of the surface of the metallic article to immerse part of the cathode and surface of the metallic article and therefore form an electropolishing cell on the surface of the metallic article. Coolant can be supplied to cool the electropolishing area. Again, examples of this electropolishing technique are taught in patent publications No. WO2009/105802, AU2013242795A1 and AU2017204328A1 the contents of which should be considered to be incorporated into this specification by this reference.

The electropolishing method of the present invention has been developed to electropolish metallic articles, particularly those metals and metal alloys that have a protective oxide coating. Examples of metals and metal alloys that the electropolishing method can be used on include chromium based metallic alloys, such as stainless steel, nickel-chromium (nickel-chrome), nickel-chrome alloys, cobalt-chromium alloys, cobalt-chromium-molybdenum alloys, and also titanium, titanium alloys, nickel alloys such as nitinol, aluminium or aluminium alloys.

One example of a chromium containing metal alloy that can be electropolishing using the method of the present invention are cobalt-chromium alloys. Like stainless steels, the presence of sufficient chromium content on the outside surface passivates the surface. Co—Cr alloys show excellent mechanical properties such as strength and toughness, castability, corrosion resistance, and wear resistance. In particular, Co—Cr alloys have excellent wear resistance, so they are used for sliding parts of artificial joints Co—Cr alloys are nominally equal in chromium and cobalt content, yielding alloys in the middle of the Co—Cr phase diagram. Co—Cr and alloys of Co—Cr typically have hexagonal close-packed (HCP) crystal structures with both chromium and cobalt taking positions as substitutional defects in the other crystal. In some embodiments, Co—Cr alloys further include molybdenum and nickel alloying elements. Co—Cr—Mo alloy also is a good choice for permanent implants, due to its high corrosion resistance. These further alloying elements create other substitutional defects that strengthen the alloy and reduce the machining capacity of cast alloy forms. The Co—Cr alloy may include further minor alloying elements (less than 1 wt %) such as Mn, Ni, Fe, C, Ti, S, P, N and W. Table 1 provides non-limiting examples of biologically compatible Co—Cr composites that could be electropolished using the method of the present invention:

TABLE 1

Examples of Co—Cr compositions

| | F75 | F799 | F90 | F562 |
|---|---|---|---|---|
| Co | 59.9%-69.5% | 58%-59% | 45%-56.2% | 29-38.8 |
| Cr | 27%-30% | 26%-30% | 19%-21% | 19-21% |
| Mo | 5%-7% | 5%-7% | — | 9%-10.5% |
| Mn | 1% max | 1% max | 1%-2% | 0.15% max |
| Ni | 1% max | 1% max | 9%-11% | 33%-37% |
| Fe | 0.75% max | 1.5% max | 3% max | 1% max |
| Si | 1% max | 1% max | 0.4% max | 0.15% max |
| C | 0.25% max | 0.35% max | 0.1% nominally | — |
| Other | | N: 0/ 25% max | P: max 0.04% | Ti: 1% max S: 0.01% max |
| W | — | — | 14%-16% | — |

In other embodiments, the electropolishing method of the present invention can be used to electropolish metallic articles formed from a nickel-chromium alloy, for example Inconel. Inconel is a family of austenitic nickel-chromium-based superalloys. Inconel alloys are oxidation-corrosion-resistant materials well suited for service in extreme environments subjected to pressure and heat. When heated, Inconel forms a thick, stable, passivating oxide layer protecting the surface from further attack.

Inconel alloys vary widely in their compositions, but all are predominantly nickel, with chromium as the second element.

TABLE 2

Examples of Inconel compositions

| Type | Ni | Cr | Fe | Mo | Nb & Ta | Co | Mn | Cu |
|---|---|---|---|---|---|---|---|---|
| 600 | ≥72.0 | 14.0-17.0 | 6.0-10.0 | | | | ≤1.0 | ≤0.5 |
| 617 | 44.2-61.0 | 20.0-24.0 | ≤3.0 | 8.0-10.0 | | 10.0-15.0 | ≤0.5 | <0.5 |
| 625 | ≥58.0 | 20.0-23.0 | ≤5.0 | 8.0-10.0 | 3.15-4.15 | ≤1.0 | ≤0.5 | |
| 690 | ≥58 | 27-31 | 7-11 | | | | ≤0.50 | ≤0.50 |
| Nuc grade 690 | ≥58 | 28-31 | 7-11 | | | ≤0.10 | ≤0.50 | ≤0.50 |
| 718 | 50.0-55.0 | 17.0-21.0 | Remndr | 2.8-3.3 | 4.75-5.5 | ≤1.0 | ≤0.35 | ≤0.3 |
| X-750 | ≥70.0 | 14.0-17.0 | 5.0-9.0 | | 0.7-1.2 | ≤1.0 | ≤1.0 | ≤0.5 |

| Type | Al | Ti | Si | C | S | P | B |
|---|---|---|---|---|---|---|---|
| 600 | | | ≤0.5 | ≤0.15 | ≤0.015 | | |
| 617 | 0.8-1.5 | ≤0.6 | ≤0.5 | 0.05-0.15 | ≤0.015 | ≤0.015 | ≤0.006 |
| 625 | ≤0.4 | ≤0.4 | ≤0.5 | ≤0.1 | ≤0.015 | ≤0.015 | |
| 690 | | | ≤0.50 | ≤0.05 | ≤0.015 | | |
| Nuc grade 690 | | | ≤0.50 | ≤0.04 | ≤0.015 | | |
| 718 | 0.2-0.8 | 0.65-1.15 | ≤0.35 | ≤0.08 | ≤0.015 | ≤0.015 | ≤0.006 |
| X-750 | 0.4-1.0 | 2.25-2.75 | ≤0.5 | ≤0.08 | ≤0.01 | | |

The 3D printed articles polished using the electropolishing method of the present invention play an important role in industry. Stainless Steel and Aluminium are involved in general purpose manufacturing. Inconel is used for jet engines. Cobalt-chrome is used in dentistry and titanium for biomedical applications.

In addition to the above advantages, it should be appreciated that electropolishing according to the present invention produces a number of favourable changes in a metallic article including, but are not limited to, one or more of:
  Brightening
  Burr removal
  Oxide and tarnish removal
  Reduction in surface profile
  Removal of surface occlusions
  Increased corrosion resistance
  Improved adhesion in subsequent plating
  Removal of directional (draw) lines
  Radiusing of sharp edges, sharp bends, and corners
  Reduced surface friction
  Stress relieved surface.

EXAMPLES

Example 1—Cobalt-Chromium Alloy

A rough surfaced (8-13 μm Ra) 3D printed cobalt chromium alloy coupon (cobalt chromium "MP1" with a surface area of 3.2 cm$^2$ with an average Ra of 9.973 μm) was placed in a stainless steel bowl forming the electrolytic reservoir and providing the cathode. The bowl contained an electrolyte bath comprising 85% $H_3PO_4$ aqueous solution. The overall electropolishing apparatus follows the general schematic shown in FIG. 1. The cobalt chromium coupon was placed in the centre of the bath equal distance from the sides and the bottom of the bowl. The positive terminal of a computer-controlled power inverter purpose built to vary peak voltage, peak current, voltage frequency, current frequency, voltage waveform, current waveform was then connected to the cobalt chromium coupon immersed in the electrolyte bath and the stainless steel bowl cathode. A cooling fan was aimed at the electrolyte bath to effect cooling of the electrolyte to maintain at a temperature of between 60 to 90° C. therein.

A power regime (as specified below in Table 3) was then applied to the bath using a computer-controlled power inverter. The computer runs a program that steps the inverter (power source) through a range of voltages/currents (current densities) and frequencies that have been pre-determined to be optimum for the part and the material to be polished. The voltage waveform is a square wave having a minimum voltage close to zero and a maximum voltage as outlined in the table.

TABLE 3

Pulse current regime

| Regime | Time (s) | Frequency (kHz) | Pulsed DC Voltage (V) | Current (A) |
|---|---|---|---|---|
| 1 (pulse) | 5 | 40 | 65 | 75 |
| 2 | 15 | 63 | 50 | 52 |
| 3 | 10 | 63 | 40 | 39 |
| 4 | 15 | 63 | 28 | 29 |
| 5 | 15 | 63 | 18 | 19 |

As shown in Table 3, the current is started at maximum, manageable limits to remove the partially bonded material from the surface of the coupon. Frequency and voltage and current are then stepped via the computer programme and this is to disrupt the diffusion layer around the coupon. The current is stepped down via the computer programme towards the end of the process to achieve the best, final finish. The target surface roughness average was 2 microns or less so programmes were developed for a length of time where this target could be met.

For each programme time, frequency, voltage and current are recorded.

For each material the surface roughness average (Ra) was measured in microns and calculated pre and post submersion. The average Ra is taken via 10 individual line scans of the surface to be treated. The pre process average is then compared to the post process average surface roughness (Ra) which is measured in microns.

The improved speed still maintains results that bring a coarse surface (~10 μm Ra) to below 2 μm Ra surface roughness in 60 s. Expected removal rates (current) fluctuates with feedback data.

Figure 3:
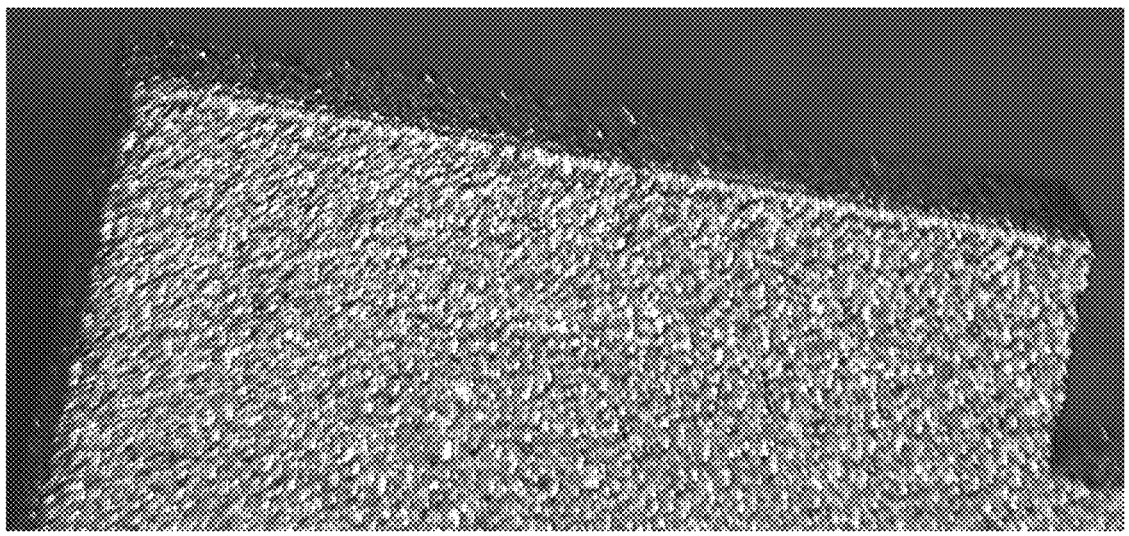
FIG. 3 shows microscope images (magnified 10× of the surface of a cobalt-chromium alloy coupon (A) formed from a 3D printed process; and (B) after application of an electropolishing run according to one embodiment of the present invention.
Figure 3:
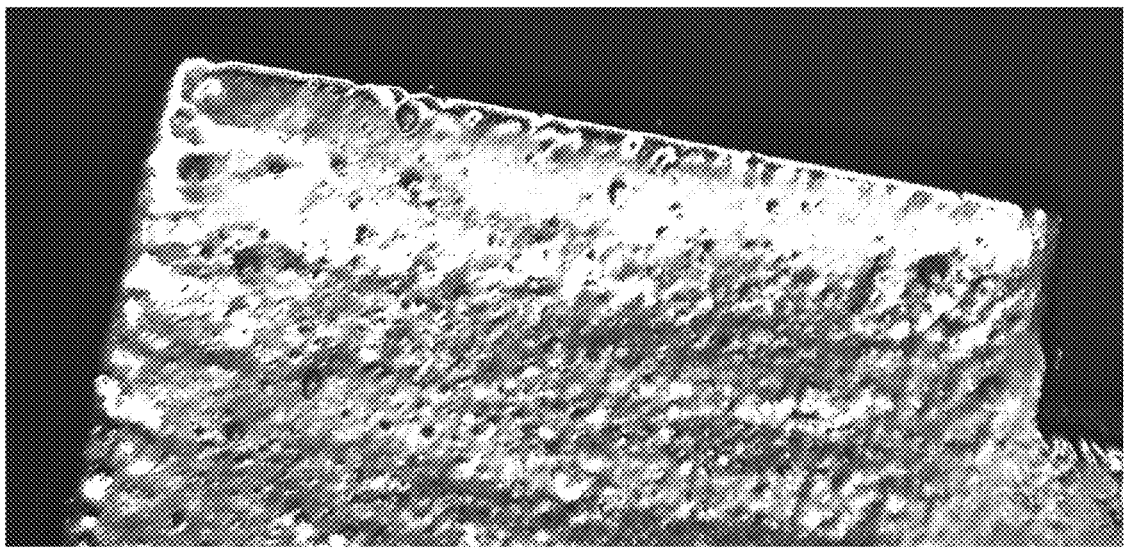

The results of an electropolishing run is shown in FIG. 3 which show the before (FIG. 3A) and after (FIG. 3B) microscope images. The relative change in surface finish was determined using ten line scans taken using a Starrett sr100 surface roughness meter from random locations of the samples front and back and an average derived from that data. The results of these measurements are provided in Table 4:

TABLE 4

Roughness measurements pre and post electropolish

| Sample No. | Prepolish Ra (μm) | Post-polish Ra (μm) |
|---|---|---|
| 1 | 8.65 | 1.45 |
| 2 | 10.35 | 2.52 |
| 3 | 11.27 | 0.90 |
| 4 | 9.43 | 2.79 |
| 5 | 10.23 | 1.87 |
| 6 | 8.92 | 1.42 |
| 7 | 8.59 | 0.66 |
| 8 | 10.75 | 1.22 |
| 9 | 12.23 | 1.40 |
| 10 | 9.26 | 0.80 |
| Average Ra (μm) | 9.97 | 1.50 |

These provided the following results:
Pre finish: Ra=9.97 μm.
Post finish: Ra=1.50 μm—based on 10 line scans. Best result 0.656 μm
Worst result 2.793 μm (crater).

These show that average surface roughness decreases from an initial coarse surface (~10 μm Ra) to below 2 μm Ra surface roughness in 60 s. As can be seen, the sharp regions illustrated in FIG. 3A are eroded away leaving a substantially flat, defect free surface in the sample shown in FIG. 3B. Furthermore, FIG. 3B shows that the electropolishing process left some craters in the surface of the material. The surface finish produced is therefore not medical grade, but it can still be used for many other applications, for example jet engine parts, aerospace applications or similar.

Example 2—Stainless Steel

A rough surfaced (12-18 μm Ra) stainless steel coupon (stainless steel "SS17" with a surface area of 3.2 cm$^2$ with an average Ra of 15.62 μm) was placed in a glass bowl forming the electrolytic reservoir. The bowl contained an electrolyte bath comprising 85% $H_3PO_4$ aqueous solution. The overall electropolishing apparatus follows the general schematic shown in FIG. 2, using a stainless steel based cathode. The stainless steel coupon was placed in the centre of the bath spaced away from the cathode. The positive terminal of a computer-controlled power inverter purpose built to vary peak voltage, peak current, voltage frequency, current frequency, voltage waveform, current waveform was then connected to the stainless steel coupon immersed in the electrolyte bath. A cooling fan was aimed at the electrolyte bath to effect cooling of the electrolyte to maintain at a temperature of between 60 to 90° C. therein.

A power regime (as specified below in Table 5) was then applied to the bath using a computer-controlled power inverter. The computer runs a program that steps the inverter (power source) through a range of voltages/currents (current densities) and frequencies that have been pre-determined to be optimum for the part and the material to be polished. The frequency ranged from 100 to 100000 Hertz (Hz); voltage from 0 to 100 volts (v) and current 0 to 50 amps. The program ran for 296 s total and included 53 different regimes. The voltage waveform is a square wave having a minimum voltage close to zero and a maximum voltage as outlined in Table 5.

TABLE 5

Pulse current regime

| Regime | Time (s) | Frequency (Hz) | Pulsed DC Voltage (V) | Current (A) |
|---|---|---|---|---|
| 1 (Pulse) | 10 | 100 | 50 | 50 |
| 2 | 5 | 22K | 15 | 15 |
| 3 | 2 | 100K | 27 | 28 |
| 4 | 5 | 60K | 0 | 0 |
| 5 | 2 | 100K | 20 | 23 |
| 6 | 5 | 22K | 18 | 24 |
| 7 | 2 | 100K | 26 | 24 |
| 8 | 5 | 60K | 30 | 35 |
| 9 | 2 | 100K | 100 | 0 |
| 10 | 5 | 84K | 26 | 29 |
| 11 | 2 | 100K | 25 | 30 |
| 12 | 5 | 22K | 24 | 27 |
| 13 | 2 | 100K | 23 | 25 |
| 14 | 5 | 22K | 16 | 22 |
| 15 | 2 | 100K | 23 | 29 |
| 16 | 5 | 84K | 19 | 26 |
| 17 | 2 | 100K | 18 | 24 |
| 18 | 5 | 22K | 15 | 19 |
| 19 | 2 | 100K | 20 | 29 |
| 20 | 5 | 60K | 15 | 23 |
| 21 | 2 | 100K | 20 | 28 |
| 22 | 5 | 84K | 15 | 24 |
| 23 | 2 | 100K | 19 | 26 |
| 24 | 5 | 22K | 15 | 24 |
| 25 | 2 | 100K | 18 | 23 |
| 26 | 5 | 84K | 10 | 15 |
| 27 | 2 | 100K | 15 | 22 |
| 28 | 5 | 100K | 12 | 17 |
| 29 | 10 | 22K | 16 | 16 |
| 30 | 5 | 100K | 26 | 24 |
| 31 | 10 | 60K | 16 | 19 |
| 32 | 5 | 100K | 22 | 25 |
| 33 | 10 | 84K | 20 | 23 |
| 34 | 5 | 100K | 19 | 22 |
| 35 | 10 | 22K | 17 | 24 |
| 36 | 5 | 100K | 12 | 17 |
| 37 | 5 | 60K | 11 | 13 |
| 38 | 10 | 100K | 12 | 14 |
| 39 | 10 | 84K | 12 | 13 |
| 40 | 10 | 100K | 12 | 15 |
| 41 | 10 | 84K | 16 | 16 |
| 42 | 5 | 100K | 26 | 24 |
| 44 | 10 | 22K | 16 | 19 |
| 45 | 5 | 100K | 22 | 25 |
| 46 | 10 | 60K | 20 | 23 |
| 47 | 5 | 100K | 19 | 22 |
| 48 | 10 | 84K | 17 | 24 |
| 49 | 5 | 100K | 12 | 17 |
| 50 | 5 | 22K | 11 | 13 |
| 51 | 10 | 100K | 12 | 14 |
| 52 | 10 | 60K | 12 | 13 |
| 53 | 10 | 100K | 12 | 15 |

The changes in frequency, voltage and current are key to the speed and quality of finish. The improved speed still maintains results that bring a coarse surface (~10 μm Ra) to below 2 μm Ra surface roughness in less than 300 s.

Figure 4:
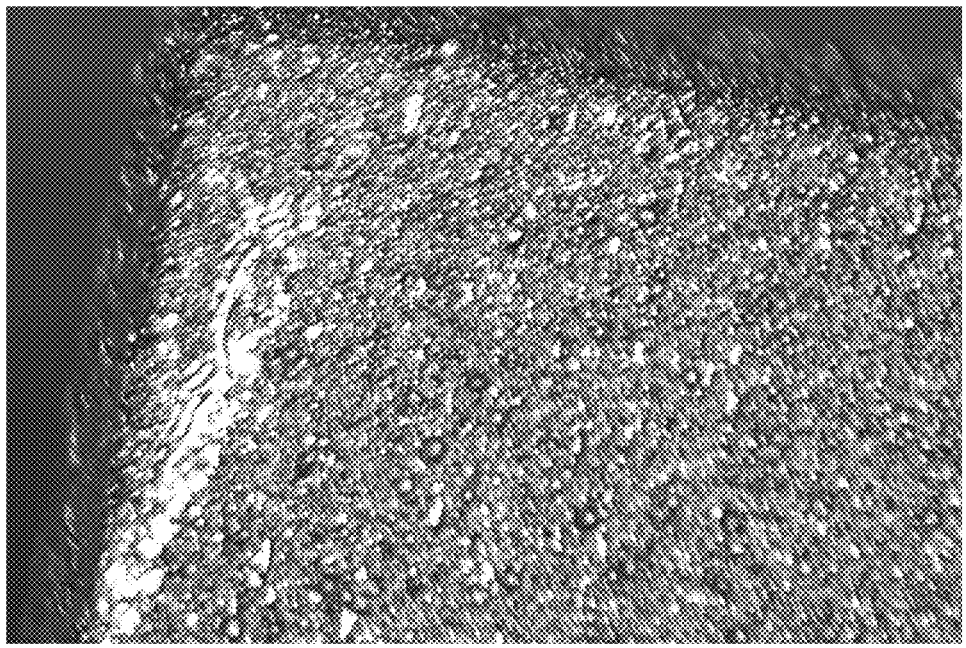
FIG. 4 shows microscope images (magnified 15× of the surface of a stainless steel alloy coupon (A) as formed from a 3D printed process (prior to electropolishing); and (B) after application of an electropolishing run according to one embodiment of the present invention.
Figure 4:
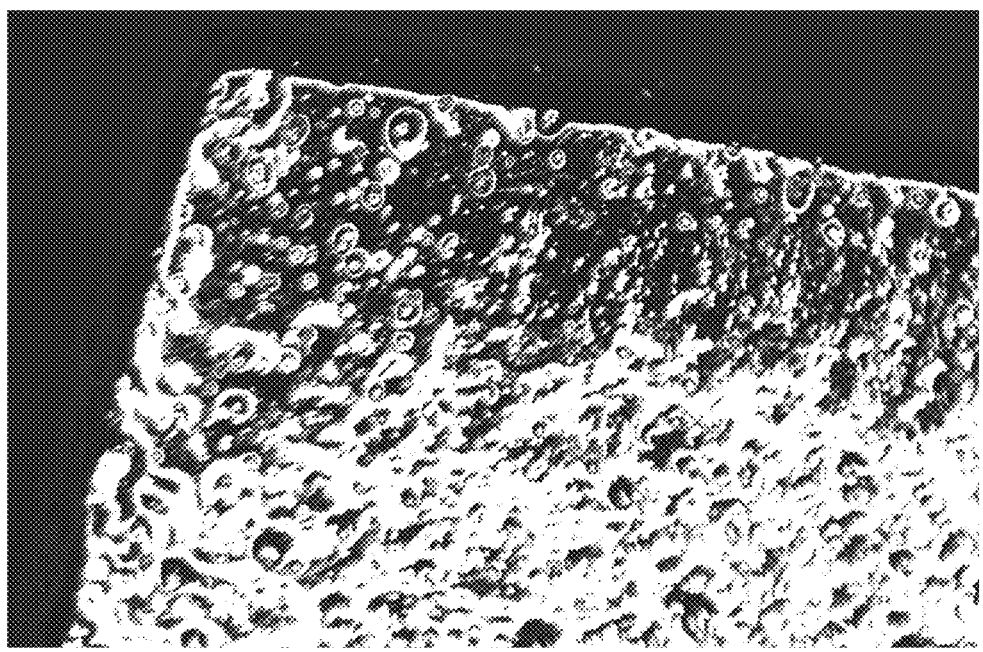

The results of an electropolishing run is shown in FIG. 4 which show the before (FIG. 4A) and after (FIG. 4B) microscope images. The relative change in surface finish was determined using ten line scans taken using a Time RTD-300 surface roughness meter from random locations of the samples front and back and an average derived from that data. The results of these measurements are provided in Table 6:

TABLE 6

Roughness measurements pre and post electropolish

| Sample No. | Prepolish Ra (μm) | Post-polish Ra (μm) |
|---|---|---|
| 1 | 17.17 | 1.80 |
| 2 | 17.31 | 1.74 |
| 3 | 13.63 | 1.78 |
| 4 | 12.40 | 2.17 |
| 5 | 17.74 | 2.15 |
| 6 | 16.58 | 2.17 |
| 7 | 15.29 | 1.80 |
| 8 | 15.14 | 2.16 |
| 9 | 14.71 | 2.17 |
| 10 | 16.18 | 1.67 |
| Average Ra (μm) | 15.62 | 1.96 |

These provided the following results:
Pre finish: Ra=15.62 μm.
Post finish: Ra=1.96 μm—based on 10 line scans. Best result 1.67 μm Worst result 2.17 μm.

These show that average surface roughness decreases from an initial coarse surface (~10 μm Ra) to below 2 μm Ra surface roughness in less than 300 s. Electropolishing SS17 created a very smooth and fine finish to the sample. The high, rough parts were taken away and the holes were not.

Example 3—Laser Cut Aluminium

A rough surfaced (5 to 8 μm Ra) laser cut aluminium coupon (5005 Grade aluminium "Al 5" with a surface area of 3.2 cm$^2$ with an average Ra of 6.40 μm) was placed in a glass bowl forming the electrolytic reservoir. The bowl contained an electrolyte bath comprising 85% $H_3PO_4$ aqueous solution. The overall electropolishing apparatus follows the general schematic shown in FIG. 2, using a stainless steel cathode. The aluminium coupon was placed in the centre of the bath spaced away from the cathode. The positive terminal of a computer-controlled power inverter purpose built to vary peak voltage, peak current, voltage frequency, current frequency, voltage waveform, current waveform was then connected to the Aluminium coupon immersed in the electrolyte bath. The electrolyte started at 40° C. A cooling fan was aimed at the electrolyte bath to effect cooling of the electrolyte to maintain at a temperature of between 60 to 90° C. therein.

A power regime (as specified below in Table 7) was then applied to the bath using a computer-controlled power inverter. The computer runs a program that steps the inverter (power source) through a range of voltages/currents (current densities) and frequencies that have been pre-determined to be optimum for the part and the material to be polished. There were 12 regimes of total time 130 s (s). The frequency ranged from 22000 to 100000 Hz; voltage from 26 to 49 V and current 6 to 24 A. The voltage waveform is a square wave having a minimum voltage close to zero and a maximum voltage as outlined in the table.

TABLE 7

| Regime | Current regime | | | |
|---|---|---|---|---|
| | Time (s) | Frequency (Hz) | Pulsed DC Voltage (V) | Current (A) |
| 1 | 15 | 60K | 49 | 24 |
| 2 | 15 | 84K | 46 | 20 |
| 3 | 10 | 60K | 44 | 20 |
| 4 | 10 | 22K | 27 | 14 |
| 5 | 10 | 84K | 40 | 14 |
| 6 | 10 | 22K | 27 | 13 |
| 7 | 10 | 60K | 35 | 14 |
| 8 | 10 | 22K | 32 | 13 |
| 9 | 10 | 100K | 34 | 9 |
| 10 | 10 | 60K | 26 | 8 |
| 11 | 10 | 22K | 26 | 10 |
| 12 | 10 | 100K | 29 | 6 |

Again, the changes in frequency, voltage and current are key to the speed and quality of finish.

Figure 5:
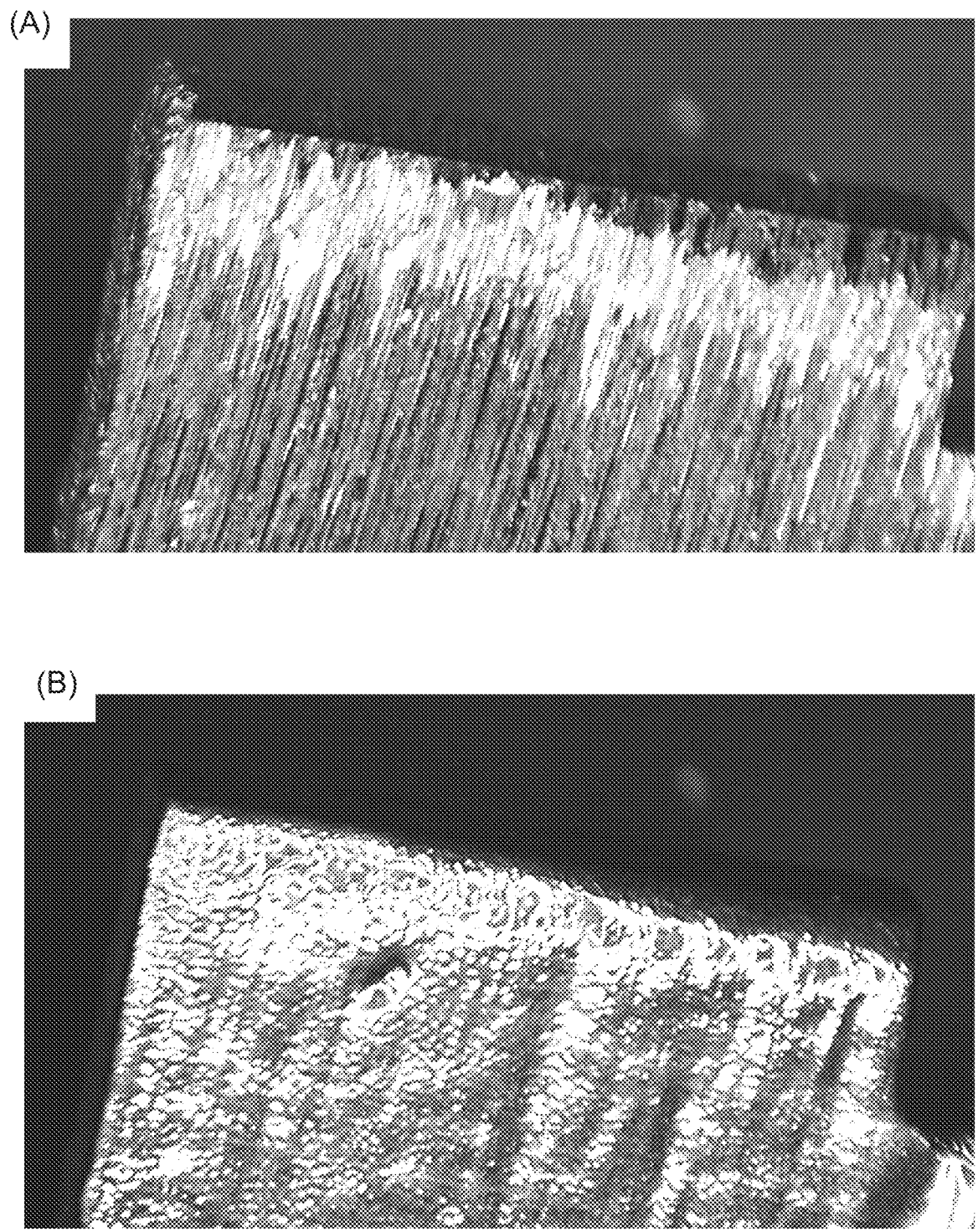
FIG. 5 shows microscope images (magnified 10× of the surface of a laser cut aluminium coupon (A) as formed (prior to electropolishing); and (B) after application of an electropolishing run according to one embodiment of the present invention.

The results of an electropolishing run is shown in FIG. 5 which show the before (FIG. 5A) and after (FIG. 5B) microscope images. The relative change in surface finish was determined using ten line scans taken using a Time RTD-300 surface roughness meter from random locations of the samples front and back and an average derived from that data. The results of these measurements are provided in Table 8:

TABLE 8

Roughness measurements pre and post electropolish

| Sample No. | Prepolish Ra (μm) | Post-polish Ra (μm) |
|---|---|---|
| 1 | 5.77 | 1.38 |
| 2 | 7.83 | 1.85 |
| 3 | 6.90 | 1.17 |
| 4 | 7.47 | 1.56 |
| 5 | 5.58 | 1.45 |
| 6 | 6.04 | 1.81 |
| 7 | 6.00 | 1.72 |
| 8 | 5.68 | 1.83 |
| 9 | 5.58 | 2.54 |
| 10 | 7.19 | 1.68 |
| Average Ra (μm) | 6.40 | 1.70 |

These provided the following results:
Pre finish: Ra=6.40 μm.
Post finish: Ra=1.70 μm— based on 10 line scans.
Again, electropolishing created a very smooth and fine finish to the sample.

Example 4—Inconel

A rough surfaced (4 to 7 μm Ra) 3D printed Inconel coupon (Inconel "Inconel 2" with a surface area of 3.2 cm$^2$ with an average Ra of 5.65 μm) was placed in a glass bowl forming the electrolytic reservoir. The bowl contained an electrolyte bath comprising 85% $H_3PO_4$ aqueous solution. The overall electropolishing apparatus follows the general schematic shown in FIG. 2, using a stainless steel cathode. The Inconel coupon was placed in the centre of the bath spaced away from the cathode. The positive terminal of a computer-controlled power inverter purpose built to vary peak voltage, peak current, voltage frequency, current frequency, voltage waveform, current waveform was then connected to the Inconel coupon immersed in the electrolyte bath. A cooling fan was aimed at the electrolyte bath to effect cooling of the electrolyte to maintain at a temperature of between 60 to 90° C. therein.

A power regime (as specified below in Table 9) was then applied to the bath using a computer-controlled power inverter. The computer runs a program that steps the inverter (power source) through a range of voltages/currents (current densities) and frequencies that have been pre-determined to be optimum for the part and the material to be polished. There were 16 programmes of total time 235 s. The frequency ranged from 22 to 100 kHz; voltage from 8 to 31 V and current 6 to 35 A. The voltage waveform is a square wave having a minimum voltage close to zero and a maximum voltage as outlined in the table.

TABLE 9

Pulse current regime

| Regime | Time (s) | Frequency (Hz) | Pulsed DC Voltage (V) | Current (A) |
|---|---|---|---|---|
| 1 | 10 | 60 | 31 | 35 |
| 2 | 15 | 84 | 30 | 30 |
| 3 | 15 | 60 | 30 | 30 |
| 4 | 15 | 84 | 26 | 28 |
| 5 | 15 | 100 | 23 | 26 |
| 6 | 15 | 60 | 26 | 24 |
| 7 | 15 | 84 | 20 | 23 |
| 8 | 15 | 22 | 19 | 22 |
| 9 | 15 | 22 | 17 | 20 |
| 10 | 15 | 100 | 14 | 13 |
| 11 | 15 | 22 | 17 | 15 |
| 12 | 15 | 100 | 8 | 7 |
| 13 | 15 | 22 | 15 | 14 |
| 14 | 15 | 22 | 14 | 12 |
| 15 | 15 | 60 | 10 | 8 |
| 16 | 15 | 100 | 8 | 6 |

Again, the changes in frequency, voltage and current are key to the speed and quality of finish.

Figure 6:
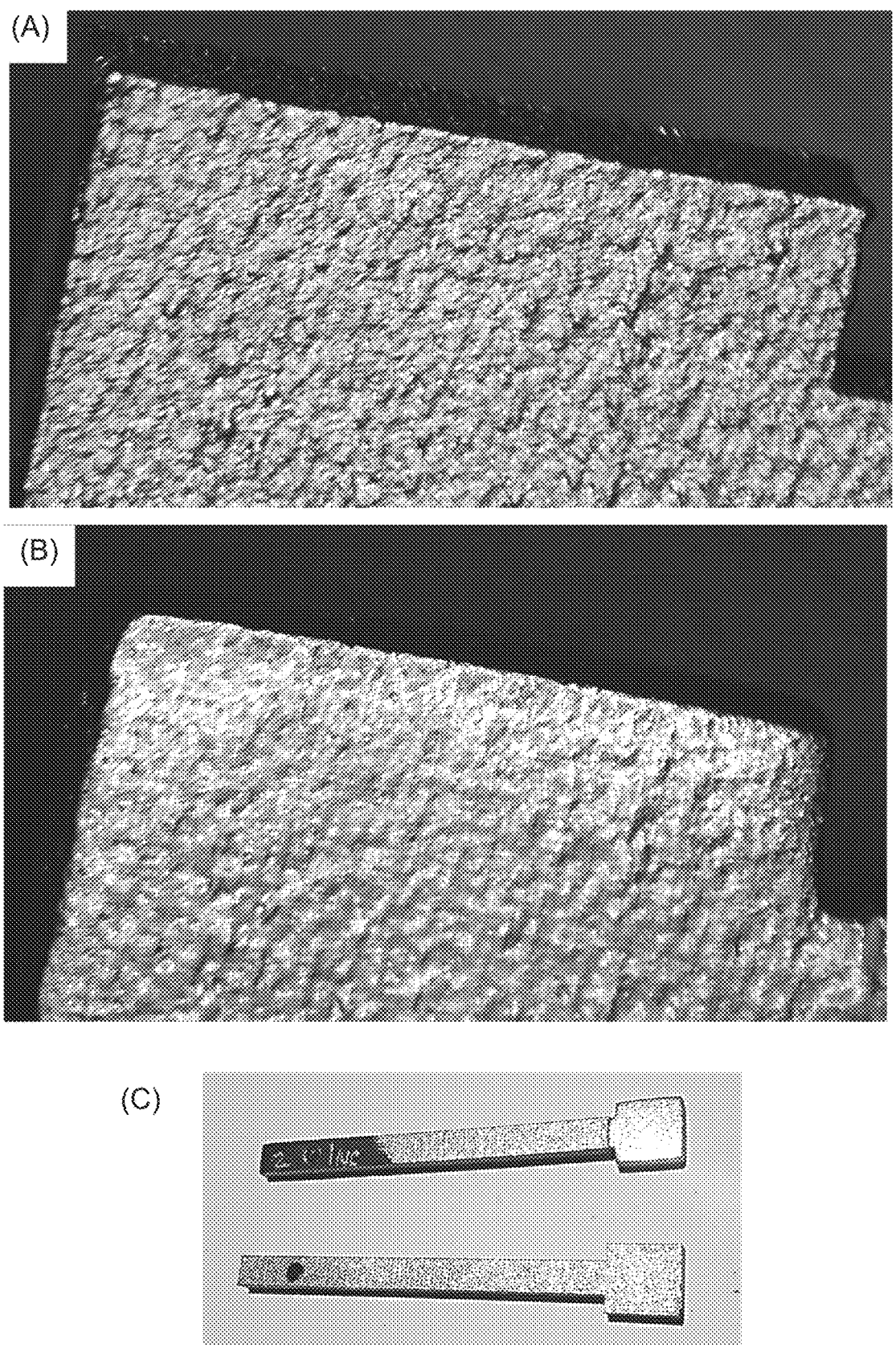
FIG. 6 shows microscope images (magnified 10× of the surface of an Inconel coupon (A) as formed from a 3D printed process (prior to electropolishing); (B) after application of an electropolishing run according to one embodiment of the present invention; and (C) a photograph comparing the Inconel coupons before (bottom) and after (top) electropolishing.

The results of an electropolishing run is shown in FIG. 6 which show the before (FIG. 6A) and after (FIG. 6B) microscope images. The relative change in surface finish was determined using ten line scans taken using a Time RTD-300 surface roughness meter from random locations of the samples front and back and an average derived from that data. The results of these measurements are provided in Table 10:

TABLE 10

Roughness measurements pre and post electropolish

| Sample No. | Prepolish Ra (μm) | Post-polish Ra (μm) |
|---|---|---|
| 1 | 4.56 | 2.29 |
| 2 | 5.76 | 1.78 |
| 3 | 4.16 | 1.92 |
| 4 | 7.27 | 1.76 |
| 5 | 5.79 | 1.72 |
| 6 | 6.71 | 1.77 |
| 7 | 4.74 | 1.82 |
| 8 | 4.64 | 1.94 |
| 9 | 6.38 | 2.1 |
| 10 | 6.48 | 1.64 |
| Average Ra (μm) | 5.65 | 1.87 |

These provided the following results:
Pre finish: Ra=5.65 μm.
Post finish: Ra=1.87 μm—based on 10 line scans.
Again, electropolishing created a very smooth and fine finish to the sample.

Example 5—Inconel Coupon—Non-Submerged Electropolishing

Figure 7:
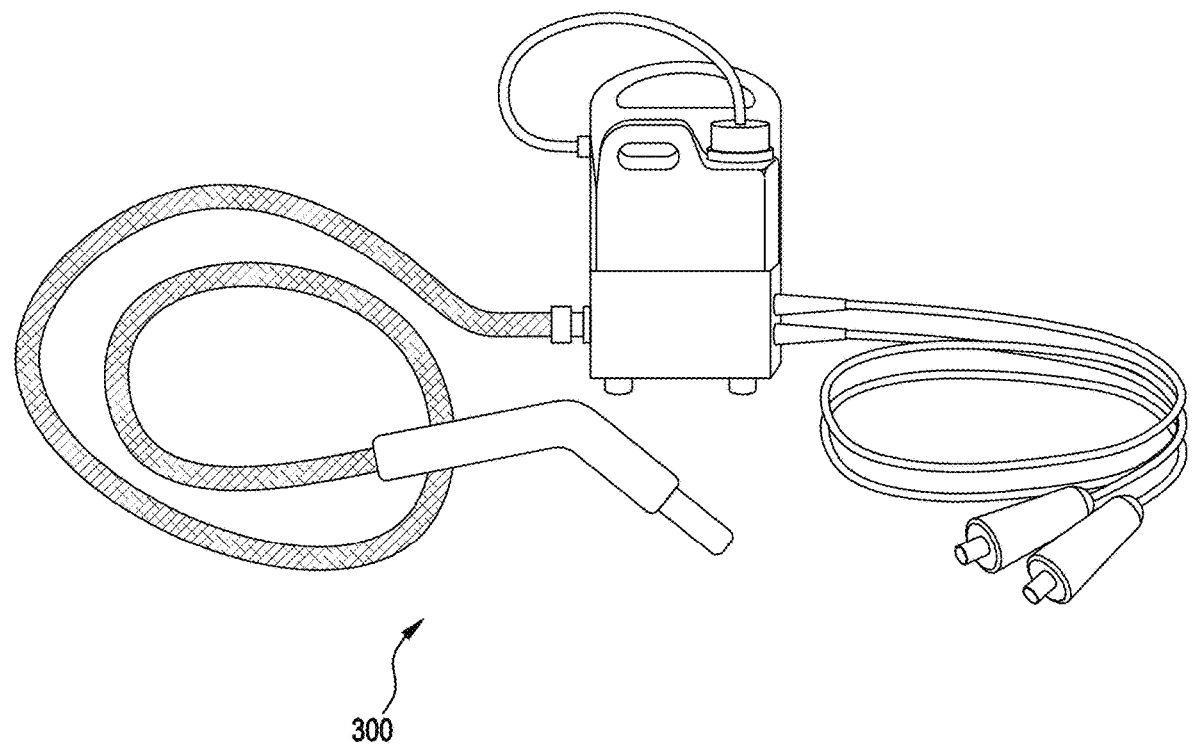
FIG. 7 illustrates a non-submerged electropolishing apparatus having a carbon fibre electrode brush used to run an electropolishing method according to a third embodiment of the present invention.
Figure 8:
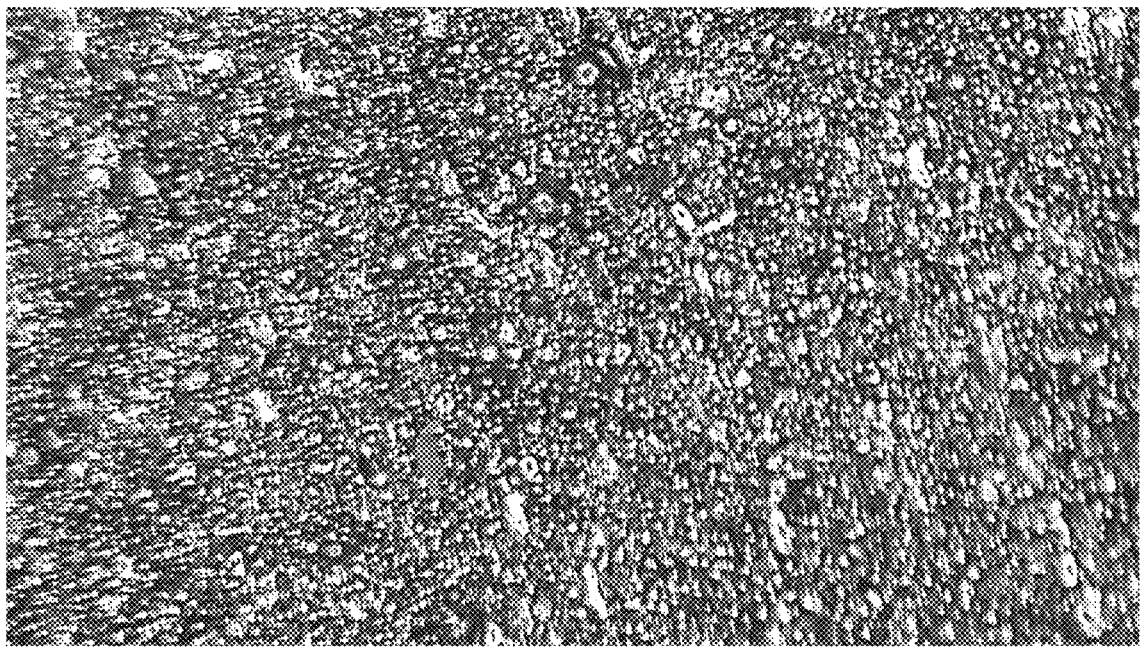
FIG. 8 shows microscope images (magnified 20×) of the surface of a stainless steel coupon (A) as formed from a 3D printed process (prior to electropolishing); and (B) after application of an electropolishing run according to one embodiment of the present invention.
Figure 8:
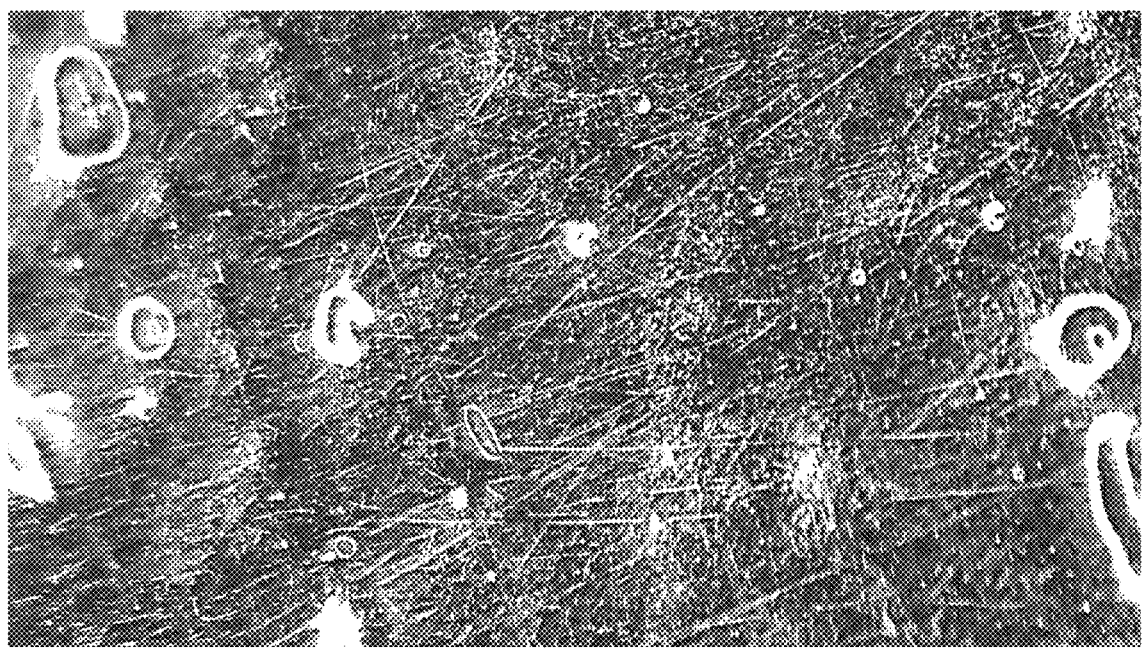
Figure 9:
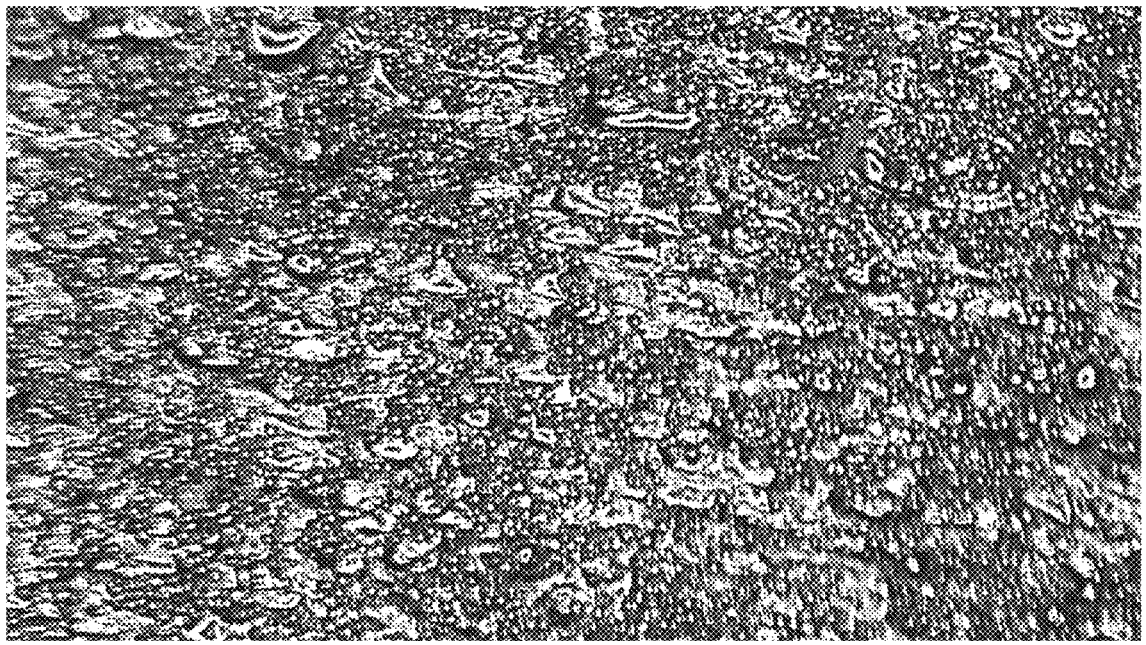
FIG. 9 shows microscope images (magnified 20×) of the surface of a titanium coupon (A) as formed from a 3D printed process (prior to electropolishing); and (B) after application of an electropolishing run according to one embodiment of the present invention.
Figure 9:
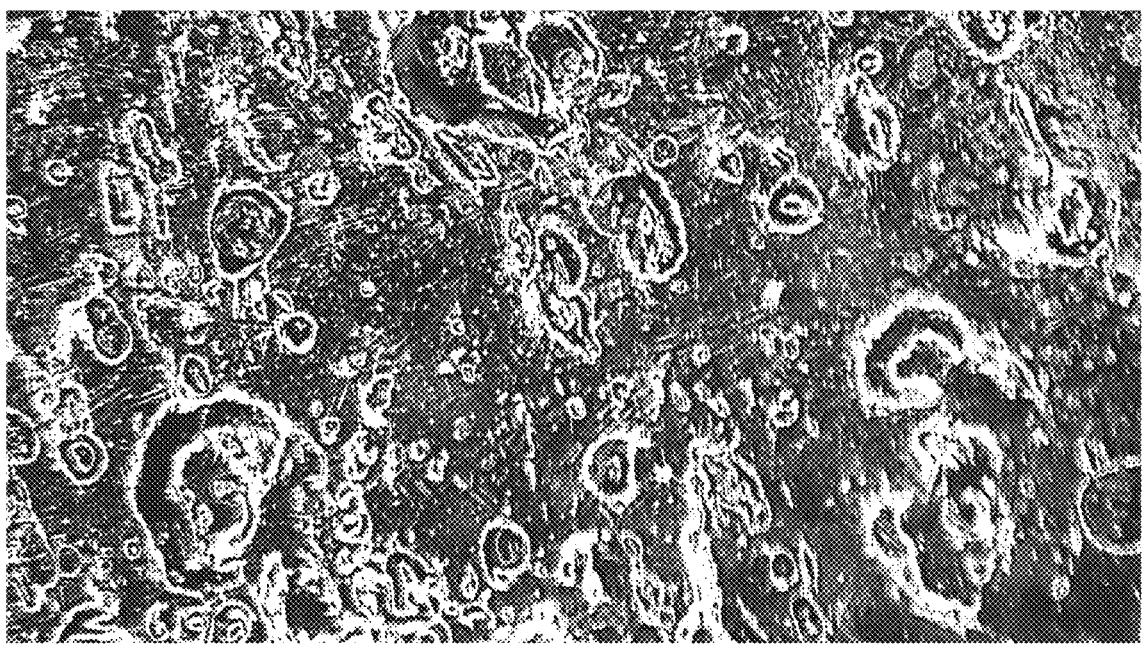

A rough surfaced (4 to 7 μm Ra) 3D printed Inconel coupon (Inconel "Inconel Coupon 3" with a surface area of 3.2 cm² with an average Ra of 5.65 μm) was held in an electrically connected clamp. It is noted that the actual area polished in the example was 1 cm² as only one large side and no edges were polished by the brush (in non-submerged examples the polished area is only that area that is contacted with the brush). The Inconel coupon 3 was then electropolished using a modified non-submerged electropolishing apparatus, model EASYkleen Easy Feeder (300 in FIG. 7) available from EASYKleen Pty Ltd, 43 Shelley Road, Moruya, NSW, 2537, Australia using a carbon fibre brush cathode for electropolishing. The Inconel coupon was connected to the power source through the clamp to form the anode of the electropolishing circuit.

An 85% $H_3PO_4$ aqueous solution electrolyte was supplied through the brush and applied to the Inconel coupon for electropolishing. As in the previous examples, the power source was modified (not illustrated) to be connected to a computer-controlled power inverter purpose built to vary peak voltage, peak current, voltage frequency, current frequency, voltage waveform, current waveform was then connected to the Inconel coupon.

A power regime (as specified below in Table 11) was then applied to the carbon fibre brush cathode using a computer-controlled power inverter. The computer runs a program that steps the inverter (power source) through a range of voltages/currents (current densities) and frequencies that have been pre-determined to be optimum for the part and the material to be polished. There were 16 programmes of total time 235 s. The frequency ranged from 22 to 100 kHz; voltage from 8 to 31 V and current 6 to 35 A. The voltage waveform is a square wave having a minimum voltage close to zero and a maximum voltage as outlined in the table.

TABLE 11

Pulse current regime

| Regime | Time (s) | Frequency (Hz) | Pulsed DC Voltage (V) | Current (A) |
|---|---|---|---|---|
| 1 | 5 | 60 | 12 | 44 |
| 2 | 10 | 60 | 9 | 40 |
| 3 | 10 | 84 | 8 | 38 |
| 4 | 10 | 22 | 8 | 37 |
| 5 | 10 | 60 | 8 | 39 |
| 6 | 10 | 84 | 6 | 38 |
| 7 | 10 | 22 | 7 | 39 |
| 8 | 10 | 100 | 6 | 28 |
| 9 | 10 | 22 | 7 | 30 |
| 10 | 10 | 60 | 6 | 32 |
| 11 | 10 | 84 | 4 | 18 |
| 12 | 10 | 100 | 4 | 18 |
| TOTAL | 115 | | | |

Again, the changes in frequency, voltage and current are key to the speed and quality of finish.

The results of an electropolishing run are provided in Table 12:

TABLE 12

Roughness measurements pre and post electropolish

| Sample No. | Prepolish Ra (μm) | Post-polish Ra (μm) |
|---|---|---|
| 1 | 5.48 | 1.62 |
| 2 | 4.46 | 1.45 |
| 3 | 5.26 | 1.95 |
| 4 | 6.49 | 2.03 |
| 5 | 4.47 | 1.28 |
| 6 | 5.01 | 2.01 |
| 7 | 5.73 | 1.34 |
| 8 | 3.97 | 0.96 |
| 9 | 5.67 | 1.8 |
| 10 | 3.72 | 2.11 |
| Average Ra (μm) | 5.65 | 1.87 |

These provided the following results:

Pre finish: Ra=5.65 μm.

Post finish: Ra=1.87 μm—based on 10 line scans.

Again, electropolishing created a very smooth and fine finish to the sample. Moreover, the results are similar to immersed method as detailed in Example 4.

Example 6—Stainless Steel—Non-Submerged Electropolishing

A rough surfaced (13.95 μm Ra) 3D printed Stainless Steel coupon ("SS 5" with a surface area of 3.2 cm$^2$ with an average Ra of 13.95 μm) was held in an electrically connected clamp. It is noted that the actual area polished in the example was 1 cm$^2$ as only one large side and no edges were polished by the brush (in non-submerged examples the polished area is only that area that is contacted with the brush). The stainless steel coupon was then electropolished using a modified non-submerged electropolishing apparatus, model EASYkleen Easy Feeder (300 in FIG. 7) available from EASYKleen Pty Ltd, 43 Shelley Road, Moruya, NSW, 2537, Australia using a carbon fibre brush cathode for electropolishing. The stainless steel coupon was connected to the power source through the clamp to form the anode of the electropolishing circuit.

An 85% $H_3PO_4$ aqueous solution electrolyte was supplied through the brush and applied to the stainless steel coupon for electropolishing. As in the previous examples, the power source was modified (not illustrated) to be connected to a computer-controlled power inverter purpose built to vary peak voltage, peak current, voltage frequency, current frequency, voltage waveform, current waveform was then connected to the stainless steel coupon.

A power regime (as specified below in Table 12) was then applied to the carbon fibre brush cathode using a computer-controlled power inverter. The computer runs a program that steps the inverter (power source) through a range of voltages/currents (current densities) and frequencies that have been pre-determined to be optimum for the part and the material to be polished. There were 29 programmes of total time 74 s (60 s of electropolishing time). The frequency ranged from 20 to 200 kHz; voltage from 4 to 20 V and current 30 to 80 A. The voltage waveform is a square wave having a minimum voltage close to zero and a maximum voltage as outlined in the table.

TABLE 12

| | Pulse current regime | | | | |
|---|---|---|---|---|---|
| Regime | Time (s) | Frequency (kHz) | Pulsed DC Voltage (V) | Current (A) | Duty Cycle % |
| 1 | 4 | 20 | 20 | 80 | 20 |
| 2 | 1 | 20 | Cooling | 0 | 20 |
| 3 | 4 | 60 | 12 | 40 | 30 |
| 4 | 1 | 60 | Cooling | 0 | 30 |
| 5 | 4 | 40 | 7.1 | 50 | 20 |
| 6 | 1 | 40 | Cooling | 0 | 20 |
| 7 | 4 | 100 | 5.6 | 57 | 20 |
| 8 | 1 | 10 | Cooling | 0 | 20 |
| 9 | 4 | 80 | 6 | 40 | 20 |
| 10 | 1 | 80 | Cooling | 0 | 20 |
| 11 | 4 | 100 | 5 | 35 | 20 |
| 12 | 1 | 100 | Cooling | 0 | 20 |
| 13 | 4 | 120 | 5.5 | 50 | 20 |
| 14 | 1 | 120 | Cooling | 0 | 20 |
| 15 | 4 | 160 | 5.4 | 40 | 20 |
| 16 | 1 | 160 | Cooling | 0 | 20 |
| 17 | 4 | 80 | 3.6 | 32 | 10 |
| 18 | 1 | 80 | Cooling | 0 | 10 |
| 19 | 4 | 140 | 4.5 | 45 | 20 |
| 20 | 1 | 140 | Cooling | 0 | 20 |
| 21 | 4 | 120 | 4 | 35 | 20 |
| 22 | 1 | 120 | Cooling | 0 | 20 |
| 23 | 4 | 180 | 4.3 | 37 | 20 |
| 24 | 1 | 180 | Cooling | 0 | 20 |
| 25 | 4 | 200 | 4.5 | 30 | 20 |
| 26 | 1 | 200 | Cooling | 0 | 20 |
| 27 | 4 | 120 | 4 | 35 | 20 |
| 28 | 1 | 120 | Cooling | 0 | 20 |
| 29 | 4 | 160 | 4 | 30 | 20 |

The changes in frequency, voltage and current are key to the speed and quality of finish. In this particular carbon fibre brush cathode run, cooling steps where zero current is applied is used between each electropolishing regime to allow the metallic piece to cool. The cooling time is aimed at cooling the metallic work piece, although there is also a minor benefit from cooling the brush electrode. This off-time assists in the effectiveness of this form of the electropolishing apparatus. As shown in the results, the power regime in Table 12 was applied in FOUR successive runs to achieve the final surface roughness.

The relative change in surface finish was determined using ten line scans taken using a Time RTD-300 surface roughness meter from random locations of the samples polished side and an average derived from that data. The results of these measurements are provided in Table 13:

TABLE 13

Roughness measurements pre and post electropolish

| Regime 4a (60 sec) | SS Coupon 5 (Ra μm) |
|---|---|
| Pre polish | 13.95 |
| First run | 7.56 |
| Second run | 4.35 |
| Third run | 2.88 |
| Fourth run | 1.22 |

These show that average surface roughness decreases from an initial coarse surface (13.95 μm Ra) to below 2 μm Ra surface. Electropolishing of coupon SS5 created a very smooth and fine finish to the sample.

Example 7—Titanium—Non-Submerged Electropolishing

A rough surfaced (~10.28 μm Ra) 3D printed titanium coupon ("Ti AMS" with a surface area of 3.2 cm² with an average Ra of 10.28 μm) was held in an electrically connected clamp. It is noted that the actual area polished in the example was 1 cm² as only one large side and no edges were polished by the brush (in non-submerged examples the polished area is only that area that is contacted with the brush). The titanium coupon was then electropolished using a modified non-submerged electropolishing apparatus, model EASYkleen Easy Feeder (300 in FIG. 7) available from EASYKleen Pty Ltd, 43 Shelley Road, Moruya, NSW, 2537, Australia using a carbon fibre brush cathode for electropolishing. The titanium coupon was connected to the power source through the clamp to form the anode of the electropolishing circuit.

An 85% $H_3PO_4$ aqueous solution electrolyte was supplied through the brush and applied to the titanium coupon for electropolishing. As in the previous examples, the power source was modified (not illustrated) to be connected to a computer-controlled power inverter purpose built to vary peak voltage, peak current, voltage frequency, current frequency, voltage waveform, current waveform was then connected to the titanium coupon.

A power regime (as specified below in Table 14) was then applied to the carbon fibre brush cathode using a computer-controlled power inverter. The computer runs a program that steps the inverter (power source) through a range of voltages/currents (current densities) and frequencies that have been pre-determined to be optimum for the part and the material to be polished. There were 23 programmes (regimes 2 to 24) of total time 93 s (of which 60 s is electropolishing). The frequency ranged from 20 to 200 kHz; voltage from 8 to 11 V and current 30 to 60 A. The voltage waveform is a square wave having a minimum voltage close to zero and a maximum voltage as outlined in the table.

TABLE 14

| | | Pulse current regime | | |
|---|---|---|---|---|
| Regime | Time (s) | Frequency (kHz) | Pulsed DC Voltage (V) | (A) | Duty Cycle (%) |
| 2 | 5 | 100 | 9.5 | 60 | 25 |
| 3 | 3 | 60 | Cooling | 0 | 30 |
| 4 | 5 | 60 | 9 | 58 | 30 |
| 5 | 3 | 20 | Cooling | 0 | 20 |
| 6 | 5 | 20 | 10 | 55 | 20 |
| 7 | 3 | 120 | Cooling | 0 | 25 |
| 8 | 5 | 120 | 11 | 45 | 25 |
| 9 | 3 | 20 | Cooling | 0 | 10 |
| 10 | 5 | 20 | 10 | 50 | 10 |
| 11 | 3 | 80 | Cooling | 0 | 20 |
| 12 | 5 | 80 | 9.5 | 53 | 20 |
| 13 | 3 | 60 | Cooling | 0 | 15 |
| 14 | 5 | 60 | 8 | 50 | 15 |
| 15 | 3 | 140 | Cooling | 0 | 25 |
| 16 | 5 | 140 | 11 | 38 | 25 |
| 17 | 3 | 200 | Cooling | 0 | 25 |
| 18 | 5 | 200 | 9 | 30 | 25 |
| 19 | 3 | 160 | Cooling | 0 | 25 |
| 20 | 5 | 160 | 9 | 37 | 25 |
| 21 | 3 | 180 | Cooling | 0 | 25 |
| 22 | 5 | 180 | 9 | 30 | 25 |
| 23 | 3 | 40 | Cooling | 0 | 25 |
| 24 | 5 | 40 | 8.5 | 45 | 25 |

The changes in frequency, voltage and current are key to the speed and quality of finish. In this particular carbon fibre brush cathode run, cooling steps where zero current is applied is used between each electropolishing regime to cool the metallic work piece, although there is also a minor benefit from cooling the brush electrode. This off-time assists in the effectiveness of this form of the electropolishing apparatus. As shown in the results, the power regime in Table 14 is applied in FOUR successive runs to achieve the final surface roughness.

The relative change in surface finish was determined using ten line scans taken using a Time RTD-300 surface roughness meter from random locations of the samples polished side and an average derived from that data. The results of these measurements are provided in Table 15:

TABLE 15

| Roughness measurements pre and post electropolish | |
|---|---|
| Regime 8a (60 sec) | Ti AMS Coupon (Ra μm) |
| Pre polish | 10.28 |
| First run | 8.39 |
| Second run | 7.15 |
| Third run | 5.91 |
| Fourth run | 4.15 |

These show that average surface roughness decreases from an initial coarse surface (10.28 μm Ra) to 4.15 μm Ra surface. Electropolishing Ti AMS created a smooth finish to the sample.

CONCLUSION

The results of each of the examples above show that rapidly electropolishing 3D printed articles is generally enhanced by high current, high frequency and stepping the power system. This leaves the 3D printed article with a smooth finish. Further research is required to refine the parameters.

Overall, the results demonstrate that where applicable, an ultra-high current can be used remove partially bonded material, in some cases by melting or otherwise severing the attachment point between that partially bonded material and the base material. High voltage/current can be used to rapidly remove material but prolonged application can leave indents and streaks in the surface. The ideal programme runs ultra-high current then high current density. The current density then decreases to enable the fine finish. The diffusion layer around the part is disturbed by stepping (up or down) frequency and voltage. One voltage works well for a short timeframe in seconds (generally less than 15 s) and then the process slows.

Materials with strong oxide layers such as titanium and aluminium break down with more speed and at lower voltages by using higher frequency.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A method for electropolishing a manufactured metallic article, the method comprising:
   contacting the metallic article with an electropolishing electrolyte; and
   electropolishing the metallic article in the electropolishing electrolyte through the application of an applied current regime comprising:
   at least two electropolishing regimes, each electropolishing regime comprising a current density of at least 2 A/cm$^2$ and a voltage comprising a shaped waveform having a frequency from 2 Hz to 300 kHz, a minimum voltage of at least 0 V and a maximum voltage of between 0.5 to 500 V,
   wherein at least one of: the frequency, current density, or maximum voltage of each electropolishing regime is changed compared to the preceding electropolishing regime.

2. A method according to claim 1, wherein each electropolishing regime is carried out with a current density of 2 A/cm$^2$ to 200 A/cm$^2$.

3. A method according to claim 1, comprising at least three electropolishing regimes.

4. A method according to claim 3, wherein each successive electropolishing regime has a different frequency.

5. A method according to claim 1, wherein each successive electropolishing regime has at least one of: generally lower maximum voltage or generally lower current density than the preceding electropolishing regimes.

6. A method according to claim 1, wherein each electropolishing regime is applied for a duration of 1 to 30 s.

7. A method according to claim 1, wherein the electropolishing step includes at least one cooling regime comprising lowering the current density following at least one electropolishing regime.

8. A method according to claim 1, wherein the electropolishing step includes application of an applied current regime comprising:
   an initial pulse comprising a current density of at least 2 A/cm$^2$ and a voltage comprising a shaped waveform having a frequency from 20 to 300 kHz, a minimum voltage of at least 0 V and a maximum voltage of between 50 to 500 V, and applied for a duration of at least 1 s; followed by
   at least two electropolishing regimes comprising a current density of at least 2 A/cm$^2$ and a voltage comprising a shaped waveform current having a frequency from 2 Hz to 300 kHz, a minimum voltage of at least 0 V and a maximum voltage of between 0.5 to 500 V and wherein the frequency and/or maximum voltage of each electropolishing regime is changed compared to the preceding electropolishing regime.

9. A method according to claim 8, wherein the initial pulse has at least the following characteristics:
   a current density of 2 A/cm$^2$ to 200 A/cm$^2$;
   the voltage of the initial pulse is greater than the voltage of each of the successive electropolishing regimes;
   the current density of the initial pulse is greater than the current density of each of the successive electropolishing regimes;
   the applied frequency of the alternating voltage of the initial pulse is different to the applied frequency of each of the successive electropolishing regimes; or
   the initial pules is applied for a duration of 2 to 10 s.

10. A method according to claim 1, wherein the shaped waveform comprises at least one of:
   one of square wave, sinusoidal, pulsed, or a combination thereof;
   a pulsed width modulation (PWM) waveform;
   a square wave pulse, having a variable dead time; or
   a current having a frequency from 10 to 300 kHz.

11. A method according to claim 1, wherein the waveform comprises a change between the maximum voltage and the minimum voltage of at least one of:
   greater than 80% of the maximum voltage; or
   greater than 1 V; or
   greater than 5 V.

12. A method according to claim 1, wherein the metallic article comprises one of:
   a chromium containing metal alloy, titanium, a titanium alloy, nickel alloys, aluminium or an aluminium alloy;
   iron-chromium alloys, nickle-chromium (nickel-chrome), nickel-chromium alloys, cobalt-chromium alloys, or cobalt.chromium.molybdenum alloys; or
   a stainless steel or Inconel.

13. A method according to claim 1, wherein the electropolishing electrolyte includes at least one of:
   $H_3PO_4$
   phosphoric acid ($H_3PO_4$) in combination with sulfuric acid ($H_2SO_4$), hydrochloric acid (HCl) or combinations thereof, and one of water or a $C_1$-$C_4$ alcohol; or
   phosphoric acid ($H_3PO_4$) in combination with one of water or a $C_1$-$C_4$ alcohol.

14. A method according to claim 1, wherein the pH of the electrolyte is from 1.0 to 7.0.

15. A method according to claim 1, wherein the electropolishing electrolyte is held at a temperature of −25 to 200° C.

16. A method according to claim 1, wherein the initial average surface roughness (Ra) of the metallic article is at least one of:
   greater than 2 μm; or
   less than 400 μm.

17. A method according to claim 1, wherein the final average surface roughness (Ra) of the metallic article is less than 2 μm.

18. A method according to claim 1, wherein the rate of material removal is from 1 to 50 μm/min.

19. A method according to claim 1, wherein the electropolishing electrolyte is contained in an electropolishing cell.

20. A method according to claim 1, wherein the electropolishing electrolyte is applied as a fluid flow onto the surface of the metallic article.

* * * * *